(12) United States Patent
Sivovolenko

(10) Patent No.: US 11,673,228 B2
(45) Date of Patent: Jun. 13, 2023

(54) METHOD FOR CONTROLLING THE POLISHING OF GEMSTONES

(71) Applicant: OCTONUS FINLAND OY, Tampere (FI)

(72) Inventor: Sergey Borisovich Sivovolenko, Ylorjarvi (FI)

(73) Assignee: OCTONUS FINLAND OY, Tampere (FI)

( * ) Notice: Subject to any disclaimer, the term of this patent is extended or adjusted under 35 U.S.C. 154(b) by 538 days.

(21) Appl. No.: 16/640,820

(22) PCT Filed: Aug. 23, 2018

(86) PCT No.: PCT/EP2018/072718
§ 371 (c)(1),
(2) Date: Feb. 21, 2020

(87) PCT Pub. No.: WO2019/042850
PCT Pub. Date: Mar. 7, 2019

(65) Prior Publication Data
US 2021/0129286 A1 May 6, 2021

(30) Foreign Application Priority Data

Sep. 1, 2017 (BE) .................................. 2017/5612

(51) Int. Cl.
*G05B 19/4097* (2006.01)
*B24B 49/12* (2006.01)
(Continued)

(52) U.S. Cl.
CPC .............. *B24B 49/12* (2013.01); *B24B 9/163* (2013.01); *B24B 51/00* (2013.01);
(Continued)

(58) Field of Classification Search
CPC ......... B24B 49/12; B24B 51/00; B24B 9/163; G05B 19/4097; G05B 2219/45199;
(Continued)

(56) References Cited

U.S. PATENT DOCUMENTS

2008/0113588 A1* 5/2008 Kelman .................. B24B 9/161
451/41

FOREIGN PATENT DOCUMENTS

| CN | 101086443 A | 12/2007 |
| CN | 101137462 A | 3/2008 |

(Continued)

OTHER PUBLICATIONS

International Search Report and Written Opinion for the International Patent Application No. PCT/EP2018/072718, dated Nov. 15, 2018, 11 pages.

*Primary Examiner* — Yuhui R Pan
(74) *Attorney, Agent, or Firm* — KDW Firm PLLC

(57) ABSTRACT

A method for controlling the polishing of a gemstone includes: obtaining a three-dimensional model of the gemstone; fixing the gemstone in a dop, wherein an initial facet to be polished is aligned; obtaining at least one image of the initial facet; based on the obtained at least one image and the obtained three-dimensional model, determining at least first setting parameters for a first planned facet positioned between the initial facet and a desired final polished facet; setting the dop for obtaining a polished gemstone having a polished facet approaching the first planned facet; obtaining at least one image of the polished facet; based on the obtained at least one image of the polished facet and the three-dimensional model, determining at least further setting parameters for a further planned facet; setting the dop for obtaining a polished gemstone having a polished facet approaching the further planned facet.

19 Claims, 18 Drawing Sheets

(51) Int. Cl.
  *G06T 7/564* (2017.01)
  *B24B 9/16* (2006.01)
  *B24B 51/00* (2006.01)
  *G06T 1/00* (2006.01)
  *G06T 7/00* (2017.01)

(52) U.S. Cl.
  CPC ........ *G05B 19/4097* (2013.01); *G06T 1/0014* (2013.01); *G06T 7/0004* (2013.01); *G06T 7/564* (2017.01); *G05B 2219/45199* (2013.01); *G06T 2207/30164* (2013.01)

(58) Field of Classification Search
  CPC ......... G06T 1/0014; G06T 2207/30164; G06T 7/0004; G06T 7/564
  See application file for complete search history.

(56) References Cited

FOREIGN PATENT DOCUMENTS

| | | | |
|---|---|---|---|
| CN | 102198701 A | 9/2011 | |
| CN | 106388153 A | 2/2017 | |
| WO | 2005048764 A1 | 6/2005 | |
| WO | WO-2005048764 A1 * | 6/2005 | ............. A44C 17/00 |
| WO | 2006087702 A1 | 8/2006 | |
| WO | WO-2006087702 A1 * | 8/2006 | ........... A44C 17/001 |
| WO | 2009068354 A1 | 6/2009 | |
| WO | WO-2009068354 A1 * | 6/2009 | ............. G01N 21/87 |

\* cited by examiner

Planned facet (not shown): angle 63.18, azimuth 265.57, depth 3.026 mm
1 Initial facet (F0): angle 64.30, azimuth 265.54, depth 3.091 mm
Difference: angle -1.12, azimuth -0.07, depth -0.065 mm Planned facet (FD): angle 63.18, azimuth 265.57, depth 3.075 mm
2 Real facet (F1): angle 63.08, azimuth 264.58, depth 3.091 mm
Difference: angle 0.10, azimuth 0.99, depth -0.016 mm 3   Planned facet (FD): angle 63.18, azimuth 265.57, depth 3.066 mm
    Real facet (F2): angle 63.06, azimuth 265.06, depth 3.072 mm
    Difference: angle 0.12, azimuth 0.51, depth -0.006 mm 4   Planned facet (red): angle 63.18, azimuth 265.57, depth 3.052 mm
    Real facet (dotted blue): angle 62.83, azimuth 265.01, depth 3.055 mm
    Difference: angle 0.35, azimuth 0.56, depth -0.003 mm 7  Final facet (FD): angle 63.18, azimuth 265.57, depth 3.026 mm Initial facet (F0): angle 64.30 azimuth 265.64, depth 3.093 mm Real facet (F2) reflect image Planned facet (FD): angle 63.2 azimuth 265.55, depth 3.056 mm

FIG. 6F

| Facet ID | Facet parameters ||| Union area | Intersection area | Symmetrical difference |
|---|---|---|---|---|---|---|
| | Angle | Azimuth | Depth, mm | | | |
| Planned FD | 63,2 | 265,55 | 3,056 | 1,44 | 1,00 | 0,44 |
| FD1 | 63,2 | 265,55 | 3,061 | 1,39 | 1,00 | 0,39 |
| FD2 | 63,2 | 265,55 | 3,065 | 1,35 | 1,00 | 0,35 |
| FD3 | 63,2 | 265,55 | 3,070 | 1,31 | 0,98 | 0,32 |
| FD4 | 63,2 | 265,55 | 3,074 | 1,25 | 0,94 | 0,31 |
| FD5 | 63,2 | 265,55 | 3,079 | 1,21 | 0,79 | 0,42 |
| FD6 | 63,2 | 265,55 | 3,083 | 1,17 | 0,63 | 0,54 |

FIG. 6I

| Facet ID | Facet parameters | | | Union area | Intersection area | Symmetrical difference |
|---|---|---|---|---|---|---|
| | Slope | Azimuth | Depth, mm | | | |
| Planned FD | 63,2 | 265,55 | 3,056 | 1,44 | 1,00 | 0,44 |
| FD4 | 63,2 | 265,55 | 3,074 | 1,25 | 0,94 | 0,31 |
| AZ1 | 63,2 | 265,3 | 3,074 | 1,21 | 0,97 | 0,24 |
| AZ2 | 63,2 | 265,05 | 3,074 | 1,19 | 0,98 | 0,20 |
| AZ3 | 63,2 | 264,8 | 3,074 | 1,15 | 0,99 | 0,16 |
| AZ4 | 63,2 | 264,55 | 3,074 | 1,10 | 1,00 | 0,10 |
| AZ5 | 63,2 | 264,3 | 3,074 | 1,09 | 0,96 | 0,13 |
| AZ8 | 63,1 | 264,3 | 3,074 | 1,12 | 1,00 | 0,12 |
| AZ9 | 63,1 | 264,55 | 3,074 | 1,16 | 0,99 | 0,17 |
| AZ10 | 63,1 | 264,8 | 3,074 | 1,19 | 0,99 | 0,20 |

METHOD FOR CONTROLLING THE POLISHING OF GEMSTONES

This is a national stage application filed under 35 U.S.C. § 371 of pending international application PCT/EP2018/072718, filed Aug. 23, 2018, which claims priority to Belgian Patent application BE 2017/5612, filed Sep. 1, 2017, the entirety of which applications are hereby incorporated by reference herein.

FIELD OF THE INVENTION

The present invention relates to a method and system for method for controlling the polishing of a gemstone, and to a computer program for performing certain steps of the method. More in particular the invention relates to the field of controlling gemstone facets parameters during polishing: such as a slope angle, an azimuth angle and a depth during the polishing process, while the gemstone is fixed in a dop of a polishing device. Embodiments of the invention are described herein with particular reference to the controlling of the polishing of diamonds, but the skilled person will understand that the invention is also applicable to other types of precious and semi-precious gemstones. Moreover, the invention is applicable for both rough gemstones, polished gemstones as well as semi-polished gemstones.

BACKGROUND

To achieve the required optical/aesthetic performance from a rough gemstone, individual facets are polished in designed orientation to obtain the required inter-facet angles and ratio's. This is currently done by polishers while the gemstone is held in a polishing dop of a tang of a polishing device. The dop is a handheld gemstone fixture. The tang is positioned adjacent a polishing wheel or scaife, such that the gemstone fixed on the dop can be placed above the polishing wheel with a facet to be polished in contact with the polishing wheel. The tang is typically provided with a measuring scale to show a measure for the orientation of the facet that is being polished. The main scale may have a smallest gradation of 1 degree, wherein an optional vernier scale may have a smallest gradation of 0.1 degree. These readings are not absolute, as the slope angle of the dop greatly depends on the level alignment of the dop axis with the polishing wheel plane.

When a cutter is polishing the stone he fixes it in the dop. To polish a predetermined facet it is important to correctly set both the slope angle and azimuth angle, and to polish the facet until the required depth. Currently available technology does not allow achieving the required accuracy for at least a number of cuts such as non-round fancy cuts and asymmetric round cuts, see Table 1 below.

TABLE 1

Approximate Dop resolution and accuracy for Round and Fancy cuts.

| | Dop slope angle repeatability | Dop azimuth repeatability | Dop slope angle accuracy | Dop azimuth accuracy |
|---|---|---|---|---|
| Round cuts | 0.1 degree | 0.5 degree* | 0.5 degree | 1 |
| Fancy cuts | 1 degree | 0.5 degree* | ~1 degree | 1-2 |

*using the side screw adjustment.

Further the cutter does not have the possibility to check if the facet is being polished correctly with the accuracy higher than the dop accuracy while the stone is still fixed in dop. Also, the cutter does not have instruments to control the polishing depth except of marking lines and ratio between the facet that is being polished and other polished facets.

In prior art polishing methods, the stone has to be removed from the pot of the dop to verify the polished facet, e.g. by scanning the gemstone in appropriate 3D scanner. Stone removal from the pot of the dop for scanning on 3D scanner or checking optical symmetry by the cutter, and putting it back in the dop dramatically reduces the processing speed. Moreover, it does not guarantee an improvement of the polishing process, i.e. it does not ensure that the desired polished facet having the designed parameters is obtained. Stone scanning by a 3D scanner allows determining whether or not the stone cut parameters are correct and what an error is for a particular facet. When this determination information is collected, the cutter may fix the stone again in the dop to continue the polishing and try to repair the found errors. A random positioning error may be added during the repeated stone fixation in dop. When the cutter fixes the stone back in the dop and adjusts the facet parameters, he still does not have the opportunity to check whether or not he is changing the facet parameters in a correct way, unless he again removes the stone from the dop. This process of verification and correction is long and iterative and not always convergent.

A partial solution to improve the accuracy would be to increase the accuracy of the dop. However, this is not a straightforward task. Indeed, it is difficult to make a dop with high absolute accuracy due to the fact that the cutting process causes a heating of the equipment and a strong temperature gradient in the dop. Because of this, the mechanical parts of the dop may expand unevenly. Further, since the gemstones that are being polished differ, they will result in a different heating of the dop. Therefore it is impossible to make a dop that will change during the heating in same way when processing different stones. Further, the high temperatures do not permit the use of an electronic scale for precise relative measurement. Also, increasing the absolute accuracy of the dop will lead to an increase in its size, which complicates its handheld use by the cutter. In addition, an increase in the absolute accuracy of the dop would lead to a significant increase in its price. Moreover, the absolute accuracy of the orientation of a facet to be polished is further dependent on the dop slope angle between the dop azimuth axis and scaife surface on which the gemstone is being polished. The polisher has to try and align the dop azimuth axis perpendicular to the scaife surface on a regular basis, as a change in facet or depth of facet alters this angle.

Therefore, until now, a system with a high absolute accuracy, a low weight and an acceptable cost does not exist. Moreover, also for robotic systems, where weight restrictions are less stringent, it is difficult to create a system with a high absolute accuracy, in view of some of the problems mentioned above. Existing robotic systems work only for a symmetric round brilliant cut with a fixed azimuth position for facets. Using a fixed azimuth position puts pressure on value optimization. Even for a typical Round Brilliant Cut (RBC), permission of asymmetricity until a certain limit permits one to push value recovery by 2 to 3% in most cases. So more and more polishers want to polish diamond with a known (designed) asymmetricity. Producing asymmetric RBC in currently available dops is challenging.

SUMMARY OF THE INVENTION

Embodiments of the invention aim to provide a method and system for controlling the polishing of a gemstone, and in particular a method and system allowing an improved setting of the polishing parameters, resulting in a higher accuracy.

According to a first aspect of the invention there is provided a method for controlling the polishing of a gemstone, said method comprising:

a. obtaining a three-dimensional model of the gemstone;

b. fixing the gemstone in a dop of a tang of a polishing device, wherein an initial facet to be polished is aligned in the dop; this typically implies that the initial facet to be polished is arranged parallel to a surface of a polishing wheel of the polishing device;

c. obtaining of an image of the initial facet of to be polished while the gemstone is in the tang, such that a contour of the initial facet can be determined from the at least one image;

d. based on the obtained reflect image and the obtained three-dimensional model, determining at least first dop setting parameters for a first planned facet positioned between the initial facet to be polished and a desired polished facet;

e. based on the first dop setting parameters for the first planned facet, setting the dop for obtaining a polished gemstone having a polished facet approaching the first planned facet; and polishing the gemstone accordingly;

f. obtaining of at least one image of the polished facet while the gemstone is in the tang, such that a contour of the polished facet can be determined from said at least one image;

g. based on the obtained at least one image of the polished facet and the three-dimensional model, determining at least further dop setting parameters for a further planned facet;

h. based on the further dop setting parameters for the further planned facet, setting the dop for obtaining a polished gemstone having a polished facet approaching the further planned facet; and polishing the gemstone accordingly;

i. if necessary, repeating the steps f-h until a desired final polished facet of the gemstone is obtained.

Using embodiments of the method of the invention the prior art problem is solved, not through an increase in the absolute accuracy of the preset facet parameters, but through an analysis of the orientation of the polished facet based on its contour, i.e. based on its shape. Because a polished facet is compared with a planned facet, and further dop setting parameters are determined based thereon, the method uses in fact relative measurements, approximately in the way the cutter does it with his eyes. During the steps c to i described above the gemstone remains fixed in the dop (i.e. the gemstone remains in the same position in the dop) and the setting of the dop (i.e. the adjusting of the position of the dop itself) is based on the obtained at least one image of a polished facet and the three-dimensional model of the gemstone.

Also, using embodiments of the method of the invention, the task of polishing the edges of a stone to a point can be easily solved by a cutter through the analysis of the relative angles of the facets. The cutter can define where he should tilt the facet to bring edges to a point and at what point he need to stop polishing by successive iterations with an increasing frequency of verification. Note that it is very difficult to solve this problem by setting the absolute angle, azimuth and depth of the facet.

Further, embodiments of the method of the invention allow to polish the stone such that the facets are polished with the correct parameters (slope angle, azimuth angle and depth of the facet), and such that adjacent facets are polished with a junction as a point.

Embodiments of the method of the invention use the shape (contour) of a polished facet rather than an absolute facet coordinates setting. Calculating of the dop setting parameters for a further polishing step is done using the facet shape derived from the at least one image of the polished facet and the obtained 3D model.

In prior art solution controlling the depth by direct measurement is very difficult, particularly when adjacent facets form a very small inter-facet angle. An over-polish of just 5 microns may open up the adjacent facet junction by more than 25 microns. In accordance with embodiments of the method of the invention, by controlling the facet shape through the use of images as described above, it is possible to measure junctions with an accuracy 10 microns and better, which provides enough accuracy to control facet depth.

According to an exemplary embodiment step g comprises: based on the obtained at least one image of the polished facet (F1) and the three-dimensional model, updating the three-dimensional model; and using the updated three-dimensional model to obtain the further dop setting parameters.

According to an exemplary embodiment, the obtaining at least one image of the initial facet in step c and/or the obtaining at least one image of the polished facet in step f comprises obtaining a reflect image by illuminating the initial/polished facet with co-axial light with an optical axis directed perpendicular on said facet and by sensing light reflected in the direction of the optical axis. The imaging device used to perform step c and f may be a commercially available reflect imaging device. The imaging device may also be an imaging device capable of obtaining both a reflect image and a structural lighting image, a reflect scanner, or any other suitable imaging device capable of obtaining a contour of the polished facet of the gemstone which is fixed in the dop.

According to an exemplary embodiment the setting of the dop in step e and/or f comprises at least one of: adjusting a slope angle of the dop with respect to a lap of the polishing device, adjusting an azimuth angle of the dop and setting a polishing depth. Generally the polishing depth depends both on polishing duration and pressure, and setting a polishing depth may comprise setting a polishing duration and/or adjusting a polishing pressure.

According to an exemplary embodiment the dop setting parameters for the first planned facet are representative for a difference in slope angle of the dop between the first planned facet and the initial facet (F0), a difference in azimuth angle of the dop between the first planned facet and the initial facet (F0), and the polishing depth of the first planned facet.

According to an exemplary embodiment the settings for the further planned facet are representative for a difference in slope angle of the dop between the first polished facet (F1) and the further planned facet, a difference in azimuth angle of the dop between the first polished facet (F1) and the further planned facet, and the polishing depth of the further planned facet.

Most polishing devices have a dop which is rotatable around a first horizontal axis to adjust a slope angle of the dop relative the lap of the polishing device, and around a second azimuth axis corresponding with an axis of the dop. However also other polishing devices may be envisaged where the orientation of a facet to be polished can be adjusted using e.g. translation movements in combination with rotation movements; more generally any means suitable to orient a facet to be polished of a gemstone in a dop, may be used.

According to an exemplary embodiment during step (d) the first dop setting parameters for the first planned facet as well as further dop setting parameters for one or more further planned facets between the initial facet to be polished and a desired polished facet, are determined; and wherein during step (g) determining at least further dop setting parameters for a further planned facet comprises verifying, based on the obtained at least one image in step (f), whether the previously determined further dop setting parameters for the further planned facet are correct and in necessary, adjusting the further dop setting parameters for the further planned facet.

According to an exemplary embodiment, in step (g) the determining of at least further dop setting parameters for a further planned facet is done by:
  calculating a plurality of different possible facets between the initial facet (F0) and the desired final polished facet (FD) based on the three-dimensional model of the gemstone;
  comparing contours of said plurality of different possible facets with a contour of the polished facet derived from the obtained at least one image;
  determining the further dop setting parameters based on a result of the comparing.

According to an exemplary embodiment after step (i) the three-dimensional model of the gemstone is changed based on the obtained final polished facet, and the method is repeated for a following facet to be polished.

According to another aspect of the invention there is provided a system for controlling the polishing of a gemstone, said system comprising:
  a 3D scanner configured for obtaining a three-dimensional model of the gemstone;
  a polishing device comprising a tang with a dop and a polishing wheel;
  an image capturing device configured for obtaining of at least one image of a facet of the gemstone whilst the gemstone is in the tang, such that a contour of the polished facet can be determined from said at least one image;
  a control unit configured to determine, based on the obtained at least one image and the obtained three-dimensional model, dop setting parameters for a planned facet positioned between an initial facet to be polished and a desired polished facet.

According to an exemplary embodiment the control unit is configured to update, based on the obtained at least one image of the polished facet (F1) and the three-dimensional model, the three-dimensional model; and to use the updated three-dimensional model to obtain the dop setting parameters.

According to an exemplary embodiment the image capturing device is configured for obtaining at least one image of the polished facet by illuminating the initial/polished facet with co-axial light with an optical axis directed perpendicular on said polished facet and by sensing light reflected in the direction of the optical axis. The image capturing device may be a commercially available reflect imaging device. The imaging device may also be an imaging device capable of obtaining both a reflect image and a color structural lighting image, a reflect scanner, or any other suitable image capturing device capable of obtaining a contour of the polished facet of the gemstone which is fixed in the dop.

According to an exemplary embodiment the image capturing device has a support structure for the tang, and the image capturing device is arranged such that an optical axis thereof is substantially perpendicular on a polished facet of a gemstone arranged in the tang when the tang is positioned on the support structure.

According to an exemplary embodiment the image capturing device comprises a transparent plate arranged to be located at a distance below a gemstone placed in a tang on the support structure, wherein the optical axis (O) of the image capturing device is oriented vertically on the transparent plate. Such a transparent plate will protect the optical parts of the image capturing device e.g. against dust. Further, it is preferred to have a distance between the transparent plate and the gemstone in order to be obtain a more clear image.

According to an exemplary embodiment the tang comprises a frame supported on a support foot, and the support structure comprises a support surface for the support foot of the tang and a support element for the frame of the tang, wherein preferably the support foot and/or the support element are configured to allow an adjustment of the position of the frame of the tang, such that the orientation of a polished facet of the gemstone in the tang can be adjusted. This will allow fine-tuning the orientation of the polished facet to be perpendicular on the optical axis of the image capturing device.

Preferred embodiments of the method and system are disclosed in the dependent claims. Advantages mentioned above for embodiments of the method apply mutatis mutandis for the system.

According to a further aspect of the invention, there is provided a computer program comprising computer-executable instructions to perform, when the program is run on a computer, one or more of the steps of any one of the embodiments of the method disclosed above. According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIGS. 6A-6J illustrate another exemplary embodiment of a process of facet parameter estimation based on facet reflect images, for use in embodiments of the method of the invention;

DESCRIPTION OF EMBODIMENTS

Figure 1:
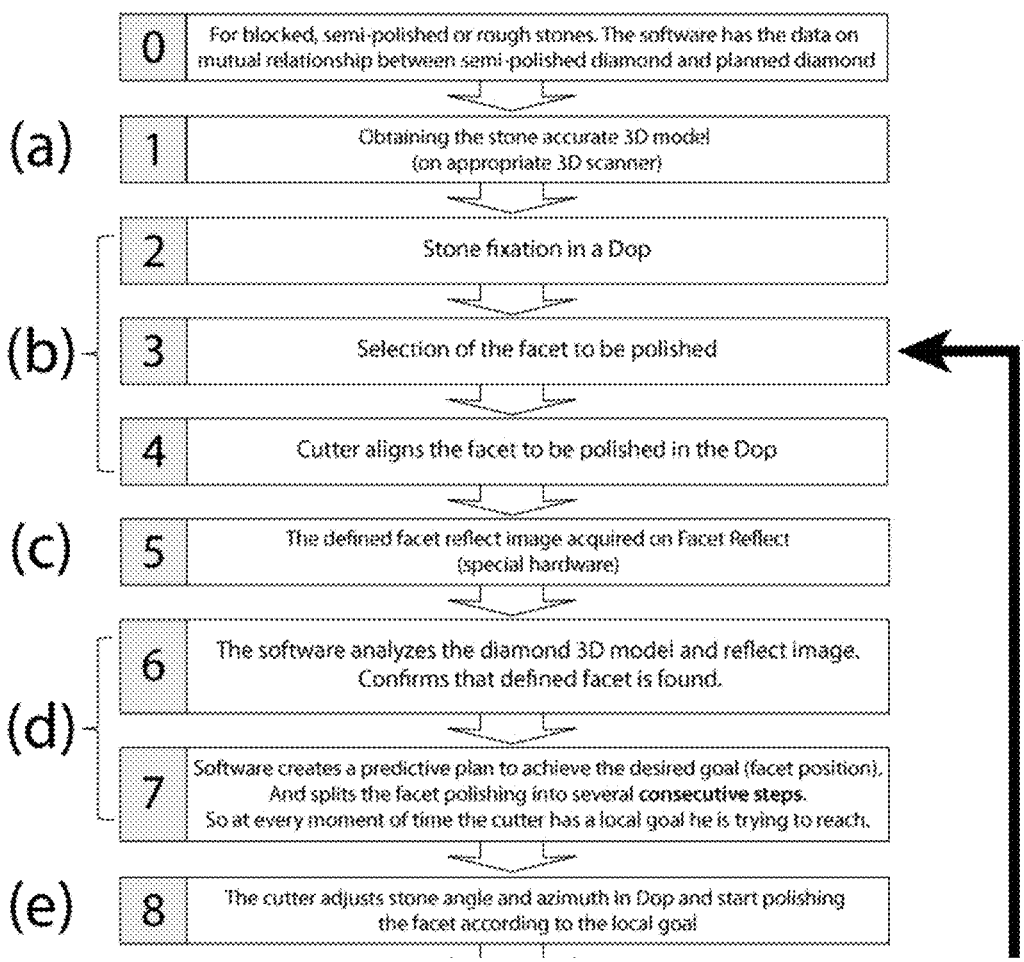
FIG. 1 is a flow chart illustrating schematically a first exemplary embodiment of the method of the invention for blocked, semi-polished or rough gemstones.
Figure 1:
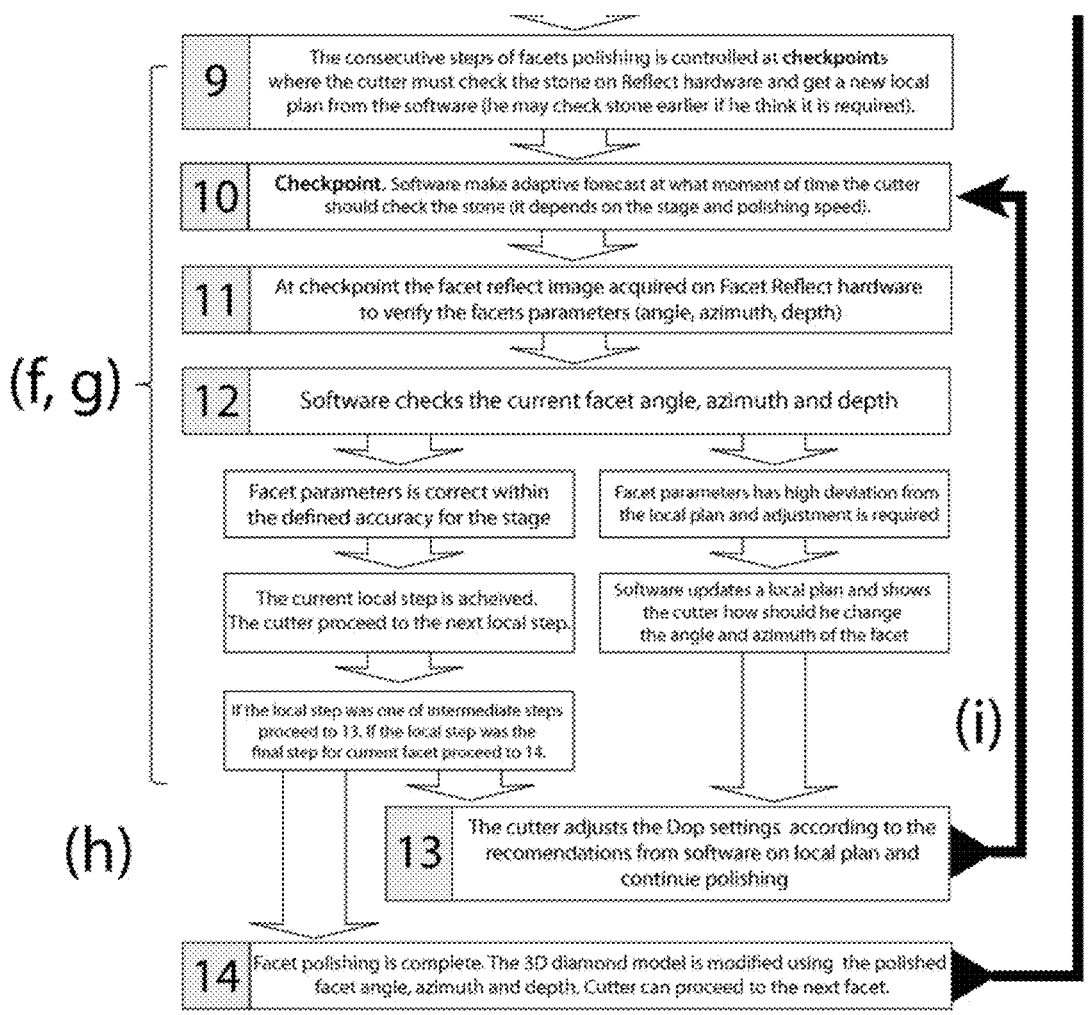

FIG. 1 illustrates a first exemplary embodiment of a method for controlling the polishing of a gemstone. The method comprises main steps (a)-(i) which are discussed in detail below.

The method is suitable for blocked, semi-polished and most rough stones. It is assumed that the relationship between the initial stone and the planned gemstone is known. Typically this information is available in software of the system.

Step (a)—Obtaining a Three-Dimensional Model of the Gemstone

In step (a) a three-dimensional (3D) model of the gemstone is obtained, using a suitable scanner. In an advantageous embodiment, this may be a 3D scanner as disclosed U.S. Pat. No. 9,292,966, the content of which is included here by reference.

Step (b)—Fixing and Aligning the Gemstone in a Dop of a Tang

Figure 4:
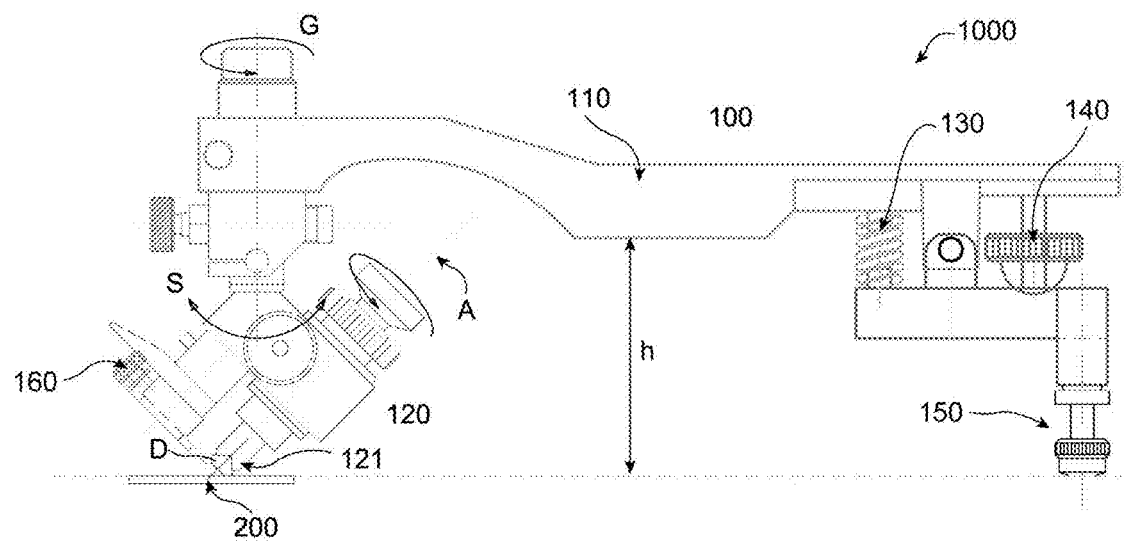
FIG. 4 illustrates schematically a polishing device.

In step (b) the gemstone is fixed in a dop of a tang of a polishing device, and an initial facet to be polished is selected and aligned in the dop of the tang of the polishing device. An example of a polishing device is shown in FIG. 4. The polishing device 1000 comprises a tang 100 and a polishing wheel 200 (also called lap or scaife). The tang 100 comprises a frame 110 with a support foot 150 and a dop 120 pivotally attached to the frame 110. In use the tang stands on the support foot 150 and the gemstone D is fixed in the dop 120. The dop 120 is pivotally attached to the frame 110, see the arrow S. In that way the slope angle between the polishing wheel 200 and an azimuth axis A of the dop 120 is adjustable. Further the gemstone fixation part 121 on which the diamond D is fixed is rotatable around the azimuth axis A of the dop 120. In that manner the diamond can be oriented such that the facet to be polished is oriented parallel to the polishing wheel. Further adjustment means 140 and spring 130 allow adjusting the height h of the frame 110. A facet to be polished can be set by setting the dop slope angle, a dop azimuth angle and a polishing depth. By rotating the dop 120 around a horizontal axis (see arrow S) parallel to the polishing wheel 200, the dop slope angle can be adjusted, and by rotating the gemstone fixation part 121 around azimuth axis A the dop azimuth angle can be adjusted. By adjusting the polishing time and/or the polishing operating parameters a polishing depth can be adjusted.

As explained above the invention is also applicable for other polishing devices using different movement means and different setting parameters for placing a fixation part on which a gemstone is fixed in a suitable position for polishing.

Step (c)—Obtaining of a Reflect Image In step (c) a reflect image of the initial facet of to be polished is obtained while the gemstone is in the tang. The obtaining of the reflect image may be performed with an imaging device having an optical axis perpendicular on the facet to be imaged. A suitable imaging device for obtaining a reflect image is the Avalon Plus device commercialized by Lexus. In the reflect image both the initial facet to be polished as well as a surrounding area (out of focus) of this facet will be visible. Typically, the reflect image of the facet is acquired such that the focus is on the facet to be imaged (here the initial facet to be polished) and such that the other parts of the stone adjacent this facet to are out of focus. So generally only the precise reflect image of defined flat facet (here the initial facet to be polished) is acquired. Preferably, the reflect image will allow to obtain both absolute and relative measurements of the facet geometry.

Figure 3A:
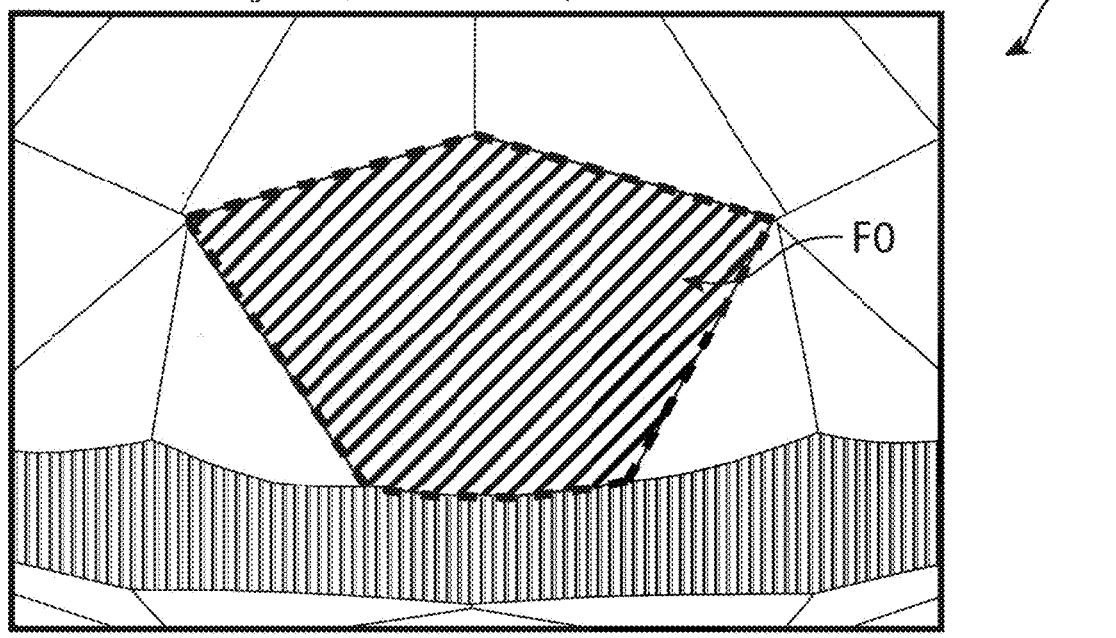
FIGS. 3A-3G illustrate an embodiment of a stage-by-stage processing of a facet in a semi-polished stone using e.g. the steps of FIG. 1 or 2, wherein a wireframe gemstone model is shown along with a reflect image of the facet aligned with 3D model of the gemstone.

FIG. 3A illustrates an image of an initial facet F0 of a gemstone D. In FIGS. 3A-3G and 6A-6J, the terms used refer to the following:

"angle" refers to the slope angle as defined above;
"azimuth" refers to the azimuth angle as defined above;
"depth" refers to a depth value of the facet as defined above.

It is noted that any coordinate system may be used to define the position of a facet, and the embodiment described here is merely an example.

Step (d)—Determining at Least a First Planned, Facet

In step (d) first dop setting parameters for a first planned facet positioned between the initial facet F0 to be polished and a desired polished facet FD, are determined based on the obtained reflect image (step (c)) and the obtained three-dimensional model (step (a)). This determining may be done by software or by a skilled polisher. The software may first confirm that the initial facet F0 is found in the 3D model of the gemstone.

In a possible embodiment illustrated in FIG. 1, a predictive plan is created in order to achieve the desired goal, i.e. in order to obtain the desired polished facet. In may be determined in this step in how many consecutive steps the polishing will be performed, and for each consecutive step the corresponding planned facet and dop setting parameters may be determined. Note however that this is not a requirement. The further dop setting parameters for further polishing steps may also be determined later, see further.

The first dop setting parameters for the first planned facet may comprise a difference value for the dop slope angle, the dop azimuth angle, and the polishing depth of the first planned facet, or corresponding parameters suitable for performing the settings of the polishing device, i.e. suitable for adjusting a position and/or orientation of the gemstone fixation part of the dop with respect to a lap of the polishing device.

Step (e)—Setting the Position of the Dop Based on the Determined First Dop Setting Parameters; and Polishing of the Gemstone In step (e) the position and orientation of a gemstone fixation part of the dop is set based on the first dop setting parameters for the first planned facet, as determined in step (d) for obtaining a polished gemstone having a polished facet approaching the first planned facet. Next the gemstone is polished accordingly.

The setting in step (e) may comprise at least one of: adjusting a slope angle of the dop with respect to a lap of the polishing device, adjusting an azimuth angle of the dop and setting a polishing depth.

Figure 3B:
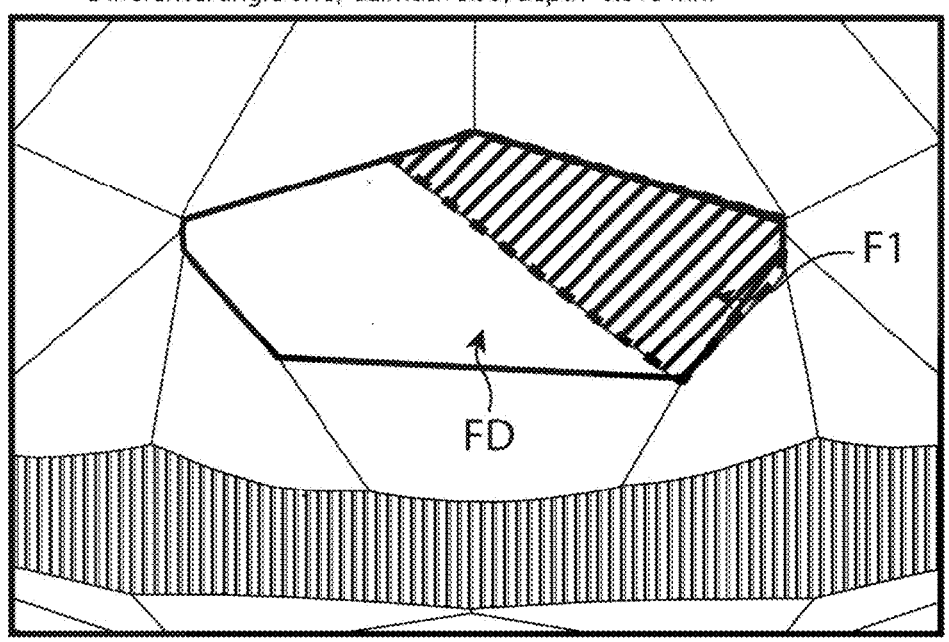
Figure 3C:
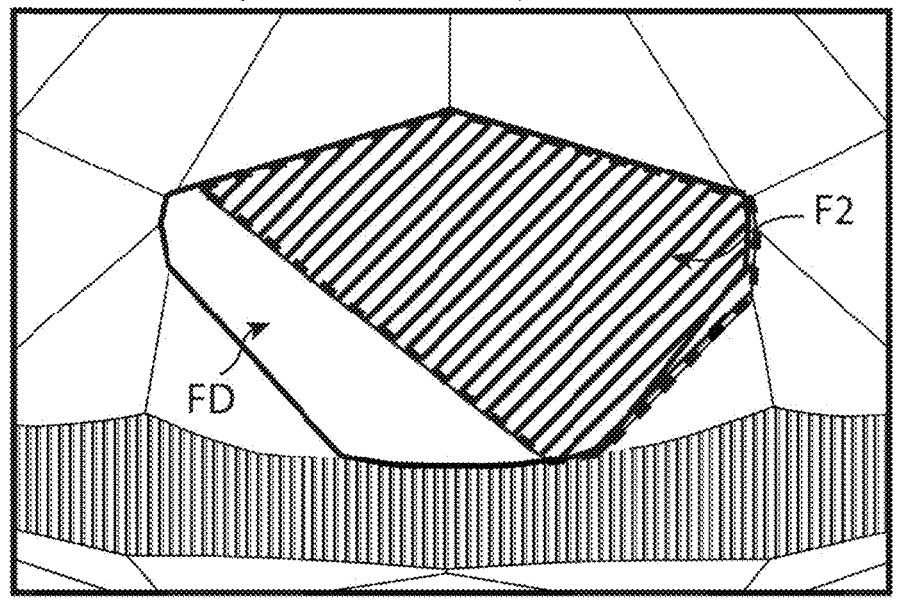
Figure 3D:
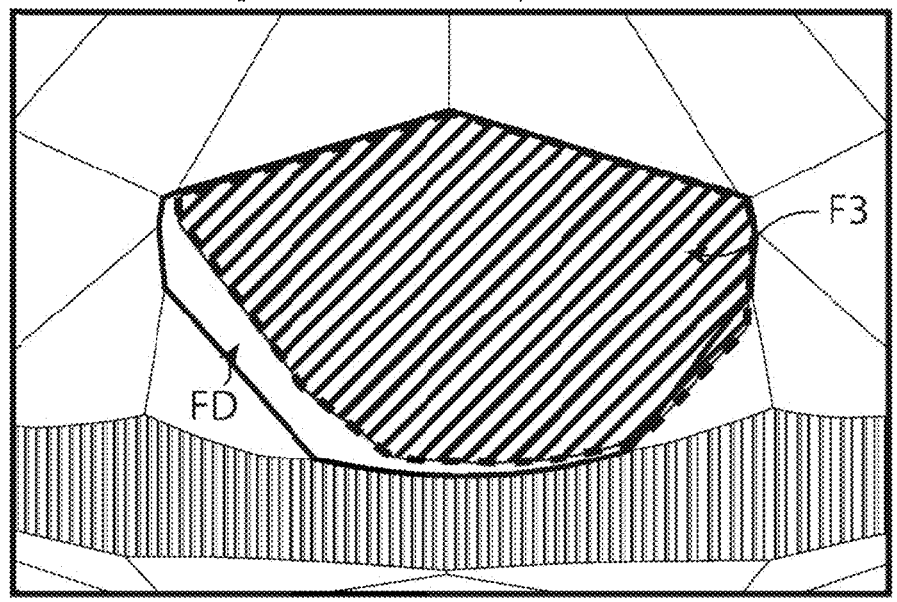
Figure 3E:
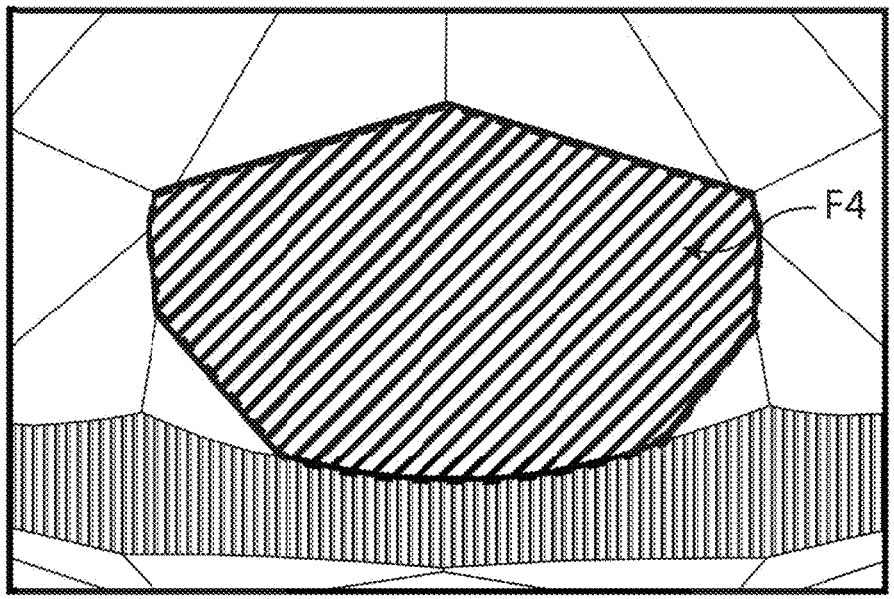
Figure 3F:
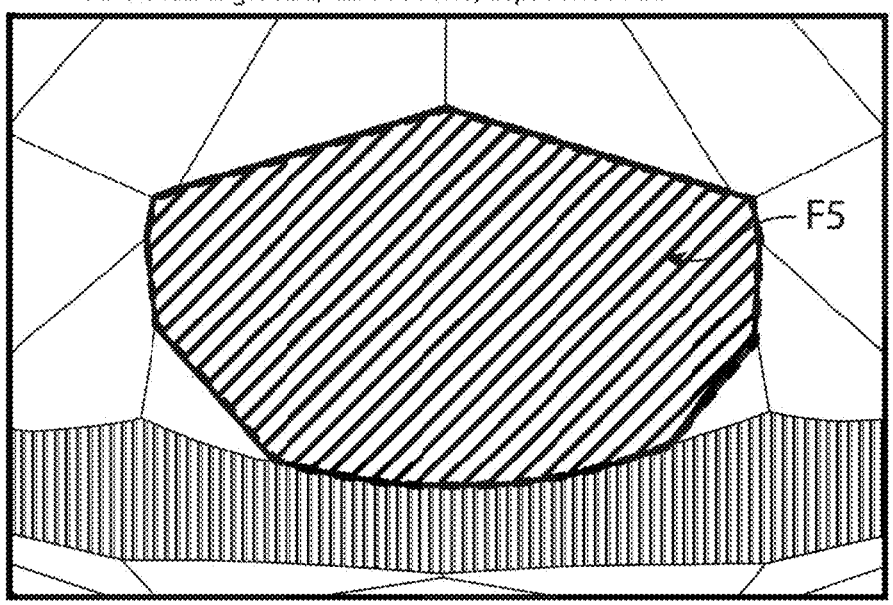
Figure 3G:
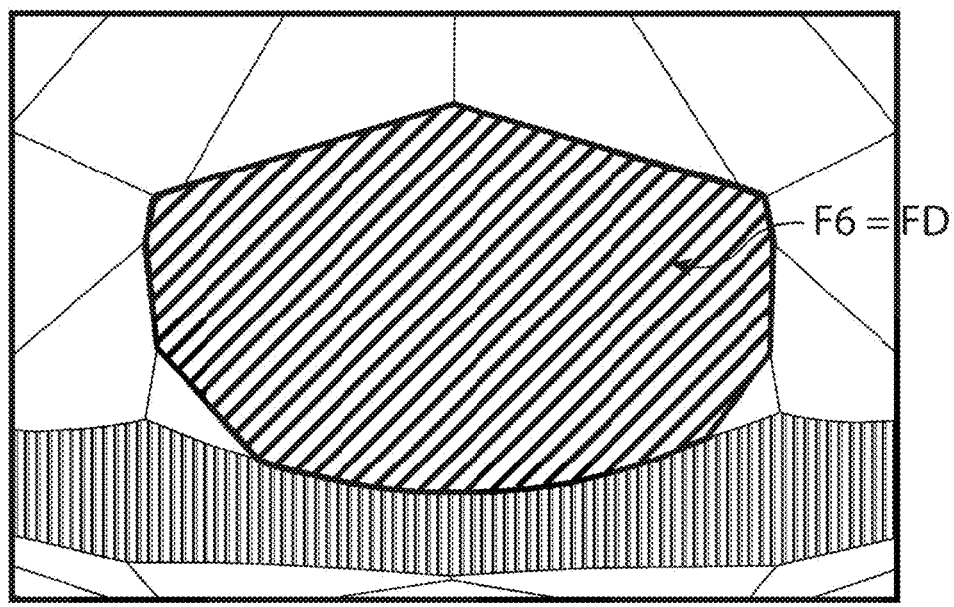

Step (f)—Obtaining of a Reflect Image of the Polished Facet while the Gemstone is in the Tang In step (f) a further reflect image is obtained while the gemstone is in the tang, but now it will be an image of the polished facet. This is illustrated in FIG. 3B, see the polished facet F1 of gemstone D. In FIG. 3B also the desired facet FD is illustrated. It will be clear the first polished facet F1 is located between the initial facet F0 and the desired polished facet FD.

Step (g)—Determining at Least a Further Planned Facet

In step (g), further dop setting parameters for a further planned facet are determined based on the obtained reflect image of the polished facet F1.

It is noted that the software or the cutter may make an adaptive forecast/plan at which further one or more moments in time the polishing progress should be checked by obtaining a reflect image. This may depend on other parameters such as the polishing speed. If a further planned facet was determined already in step (d) then the software determines, based on the reflect image of the first polished facet, if the previously determined setting parameters can be used or if those parameters need to be adjusted, see no. 12 in FIG. 1. If the facet parameters (e.g. slope angle, azimuth angle, depth) of the first polished facet F1 are within a predetermined accuracy range, the polishing proceeds according to the plan determined in step (d). If the facet parameters are outside of the predetermined accuracy range, then the previously determined plan is adjusted, resulting in an adjustment of the previously determined further parameter settings.

Step (h)—Setting the Position of the Dop Based on the Determined Further Dop Setting Parameters; and Polishing of the Gemstone In step (h) the position and orientation of the gemstone fixation part of the dop is set based on the further dop setting parameters for the further planned facet, for obtaining a polished gemstone having a polished facet approaching the further planned facet. Next the gemstone is polished accordingly.

This may be done in a similar manner as described above for step (e).

Step (i)—Repeating Previous Steps (f)-(h)

If necessary, the steps (f)-(h) are repeated until the desired polished facet is obtained.

An example of stage-by-stage processing of a facet in a semi-polished stone using the steps above is shown in FIGS. 3A-3G. The wireframe gemstone model is shown in FIGS. 3A-3G along with a reflect image of an imaged facet aligned within the 3D wireframe gemstone model. FIG. 3A shows the initial facet F0 to be polished within the 3D wireframe gemstone model. FIGS. 3B-3G show consecutive polished facets F1, F2, F3, F4, F5, F6, wherein facet F6 corresponds with the final polished facet.

Once the facet polishing is complete (F6 equals FD within the required tolerances), the scanned 3D model may be modified with the final polished facet F6 using the determined position of the facet. The cutter can now proceed with the next facet.

The described process can be used for controlling the whole polishing process step by step of a blocked or semi-polished stone. The facet parameters may be controlled without removing the stone from the dop using the procedure of FIG. 1. This scheme allows the cutter to adjust its work on processing the stone without removing it from the dop and achieve the planned stone parameters. That will lead to an increase in the speed and accuracy of stone processing.

This method of processing allows creating a new type of automated polishing systems, including systems for the final polishing of the stone. Such new type systems will not have the drawbacks of existing systems that work through the absolute parameters (angles, azimuths and heights of facets) settings during the polishing process. For current automated systems, there are significant problems for controlling the parameters of the given facets. The facet polishing depth is controlled by measuring the absolute depth, which has low accuracy due to the heating problems described earlier, as well as the fact that gemstones like diamonds have directional hardness, which results in large difference in rate of cutting of any facet. So facet junctions are often underpolished or overpolished on these prior art machines.

The described process can be used for controlling the polishing process for rough stones. The process flow of FIG. 1 is applicable also for rough diamonds, especially if their shape meets certain requirements. The method will be possible e.g. when the shape of the rough stone has some distinct features that allow facet position identification. If a rough stone has a shape close to round or oval (which complicates the process of unambiguous identification of the facet position), then at least one facet may be polished on the stone using a prior art method, whereupon an embodiment of the method of the invention may be used. Indeed, the added facet may have a sufficiently large size to help with the identification of future polished facets.

Figure 2:
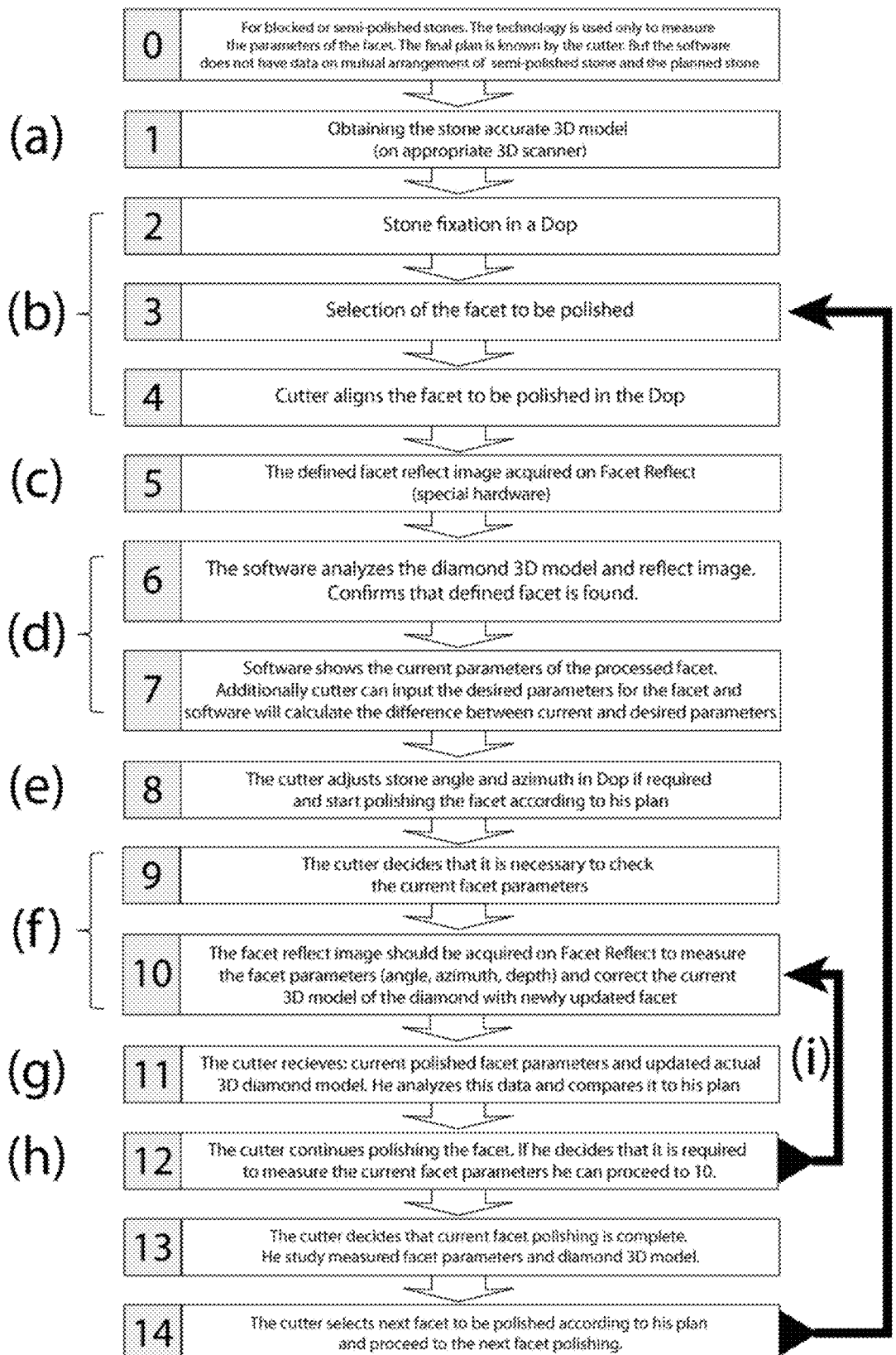
FIG. 2 is a flow chart illustrating schematically a second exemplary embodiment of the method of the invention for blocked, semi-polished or rough gemstones.

FIG. 2 illustrates another exemplary embodiment of a method for controlling the polishing of a gemstone while the stone is mounted in the dop. In this embodiment it is assumed that the polishing plan is known to the cutter, but that it is not necessarily present in the same software as the software in which the 3D scan of the stone and the reflect image data are being analyzed. Steps (a)-(c) are similar to the steps (a)-(c) of FIG. 1. In step (d) the cutter can input the desired parameters (e.g. the slope angle, the azimuth angle, the depth) for the desired polished facet and the software can then calculate the difference between the parameters derived from the reflect image and the input parameters. Step (e) is similar to step (e) of FIG. 1. In step (f) it is the cutter who decides when it is necessary to obtain the reflect image of the polished facet, and next the 3D model of the stone is updated based the data in the reflect image. In step (g) the cutter determines based on the updated 3D model the further parameter settings to be used. In step (h) the cutter sets the position and orientation of a gemstone fixation part of the dop based on the determined further parameter settings, and continues the polishing. In step (i), if needed the steps (f) and (g) are repeated. When the cutter decides that the current facet polishing is finished, the cutter selects the next facet to be polished according to his plan.

In other words, the system allows measurement of facet parameters during the polishing when the diamond is fixed in the dop even if the final plan is not defined in software, but that final plan is known by the cutter (this plan could be in third party software, or it could be a manually created allocation). In such case the system will measure the real parameters of the polished facet while the gemstone is mounted in the dop and transfer this information to the cutter, while the cutter can decide how to use that information to achieve his plan.

Figure 5:
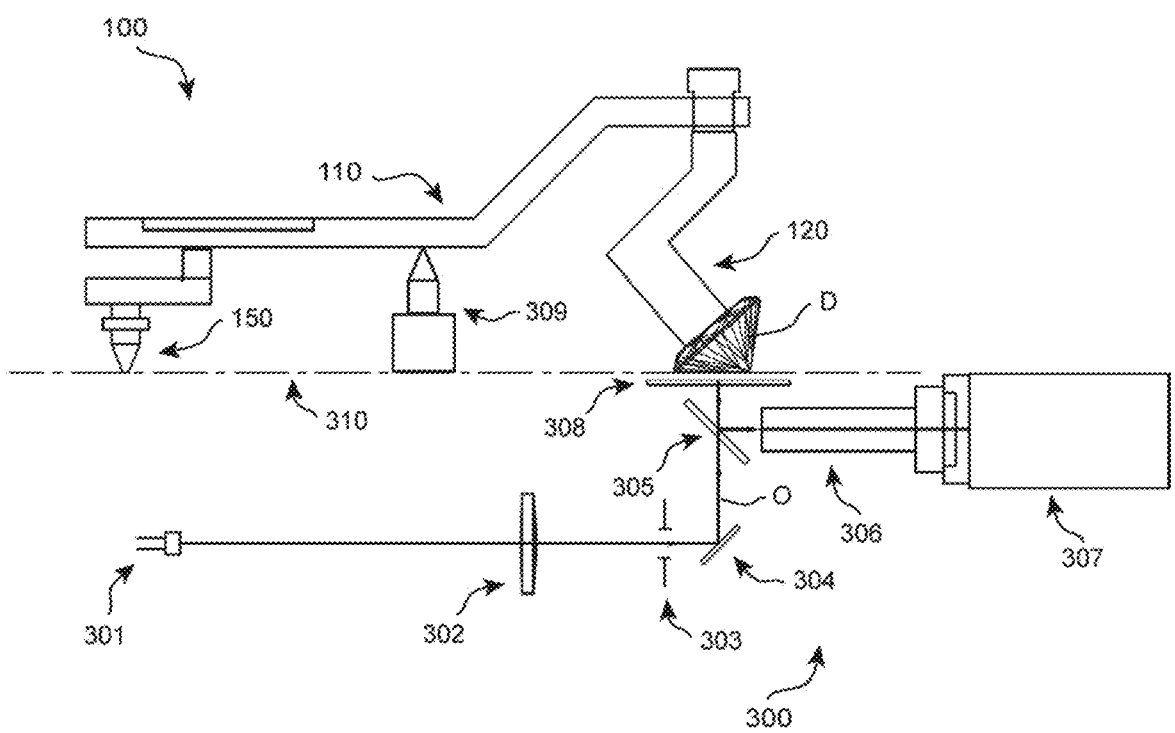
FIG. 5 illustrates schematically an exemplary embodiment of part of a system of the invention including a reflect image capturing device that allows acquiring the facet reflect image while a diamond is fixed in the dop.

FIG. 5 illustrates an exemplary embodiment of parts of a system of the invention including a tang 100 arranged in a reflect image capturing device 300 that allows acquiring a facet reflect image while diamond is fixed in the dop 120 of the tang 100. The reflect image capturing device 300 comprises a light source 301, a focusing lens 302, an aperture 303, a first surface mirror 304, a beam splitter 305, a macro lens 306, a camera 307, a transparent plate in the form of a flat glass table 308, and a support structure comprising a support surface 310 and a support element in the form of an actuator 309 for supporting the tang 100, such that a facet to be imaged of a diamond D fixed in the dop 120 of the tang 100 is oriented substantially perpendicular on the optical axis O. The actuator 309 and any adjustment means in the tang 100 may allow a fine-tuning of the orientation of the polished facet.

In embodiments of the method of the present invention, a facet to be polished is polished in the polishing device 1000 with a tang 100 of FIG. 4, whereupon the tang 100 is transferred to the reflect image capturing device 300 of FIG. 5 in order to obtain a reflect image of the facet polished. These steps can be repeated a number of times as has been illustrated and explained above with reference to FIGS. 3A-3G, in order to obtain a series of reflect images of polished facets F1, F2, etc.

FIGS. 6A-6J illustrate an exemplary embodiment of a process of facet parameter estimation based on a facet reflect image, for use in embodiments of the method of the invention. According to the illustrated exemplary embodiment the determining of dop setting parameters for a further planned facet is done by:

- calculating a plurality of possible facets between the initial facet (F0) and the desired final polished facet (FD) e.g. with different depths and/or azimuth angles and/or slope angles based on the three-dimensional model of the gemstone; this can be done in different steps as will be explained below; in the example below first the depth is varied, and next the azimuth and slope angles, but other optimization strategies are also possible;
- comparing contours of said plurality of different possible facets with a contour of the polished facet derived from the reflect image; this may be done using various different methods as will be explained below;
- determining the further dop setting parameters based on a result of the comparing; typically first one of the plurality of possible facets is selected, the selected facet being the facet for which the match is best; whereupon the further dop setting parameters are determined.

Figure 6A:
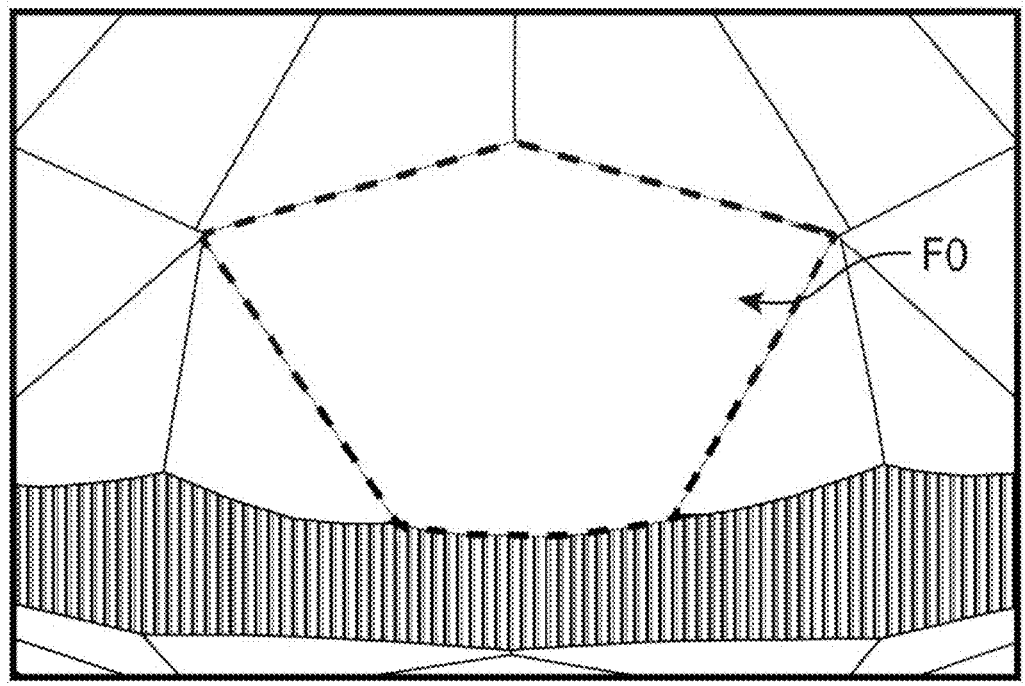

FIG. 6A shows the defined initial diamond facet F0 to be polished. Parameters of the diamond in the initial stage were measured by a precise 3D scanner. In other words, the parameters (slope angle, azimuth angle and depth) of all diamond facets including defined facet F0 are known in the initial stage. The absolute parameters of the initial facet F0 can be used as a basis for further measurements.

Figure 6B:
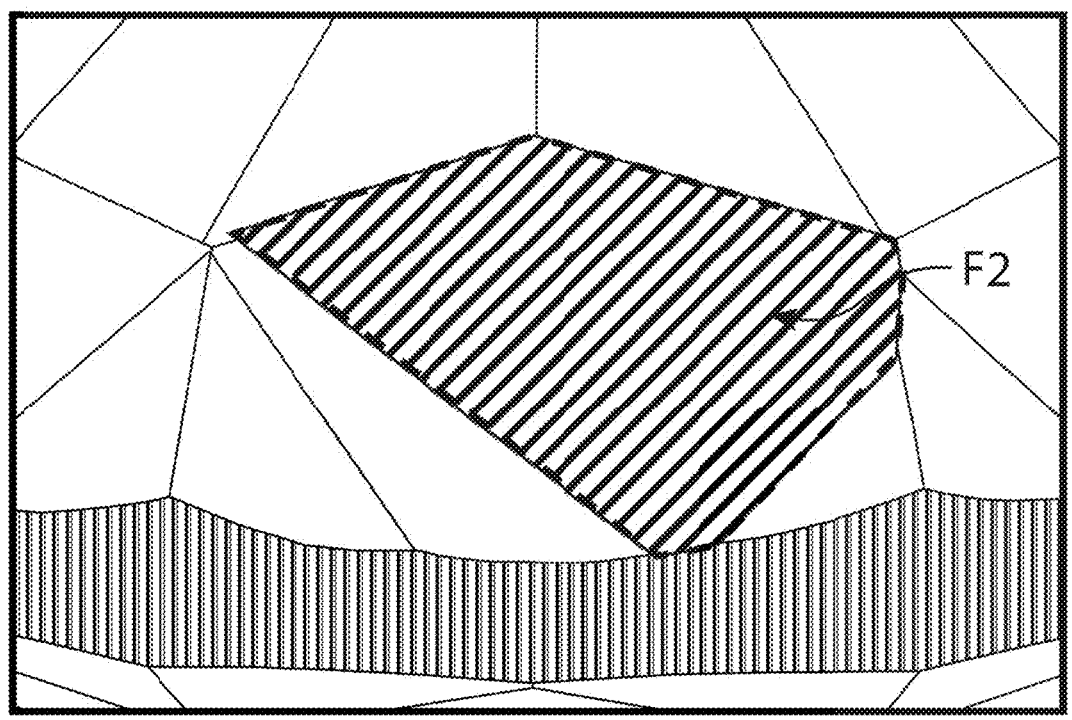
Figure 6C:
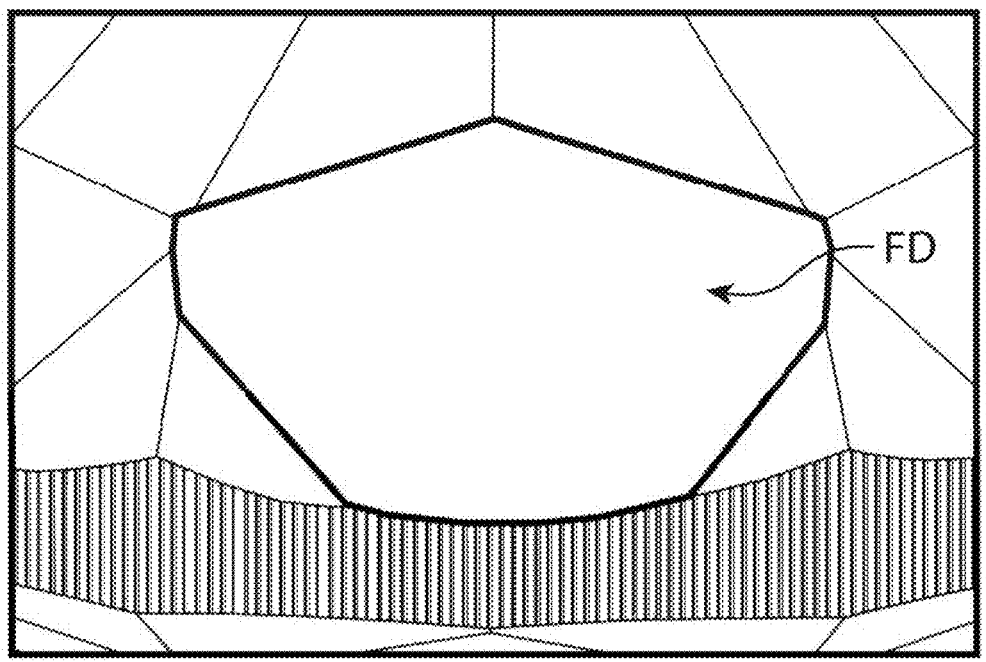

FIG. 6B shows the reflect image of a polished diamond facet F2 acquired while the diamond is fixed in the dop, e.g. after one or more polishing steps intended to obtain a planned facet FD (see FIG. 6C). The software may define the contour of polished facet F2. FIG. 6C shows the planned facet FD that a cutter whishes to achieve after a number of polishing steps. The parameters of the planned facet FD are also known in the initial stage.

Figure 6D:
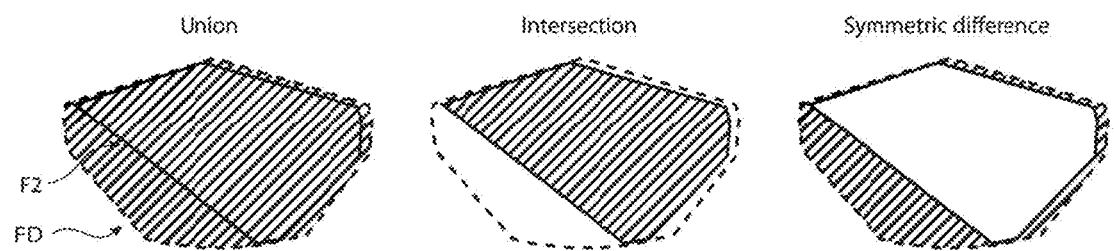

FIG. 6D shows the symmetric difference between the contour of the planned facet FD and the contour of the real polished facet F2 calculated as the polygons union without intersection.

Figure 6E:
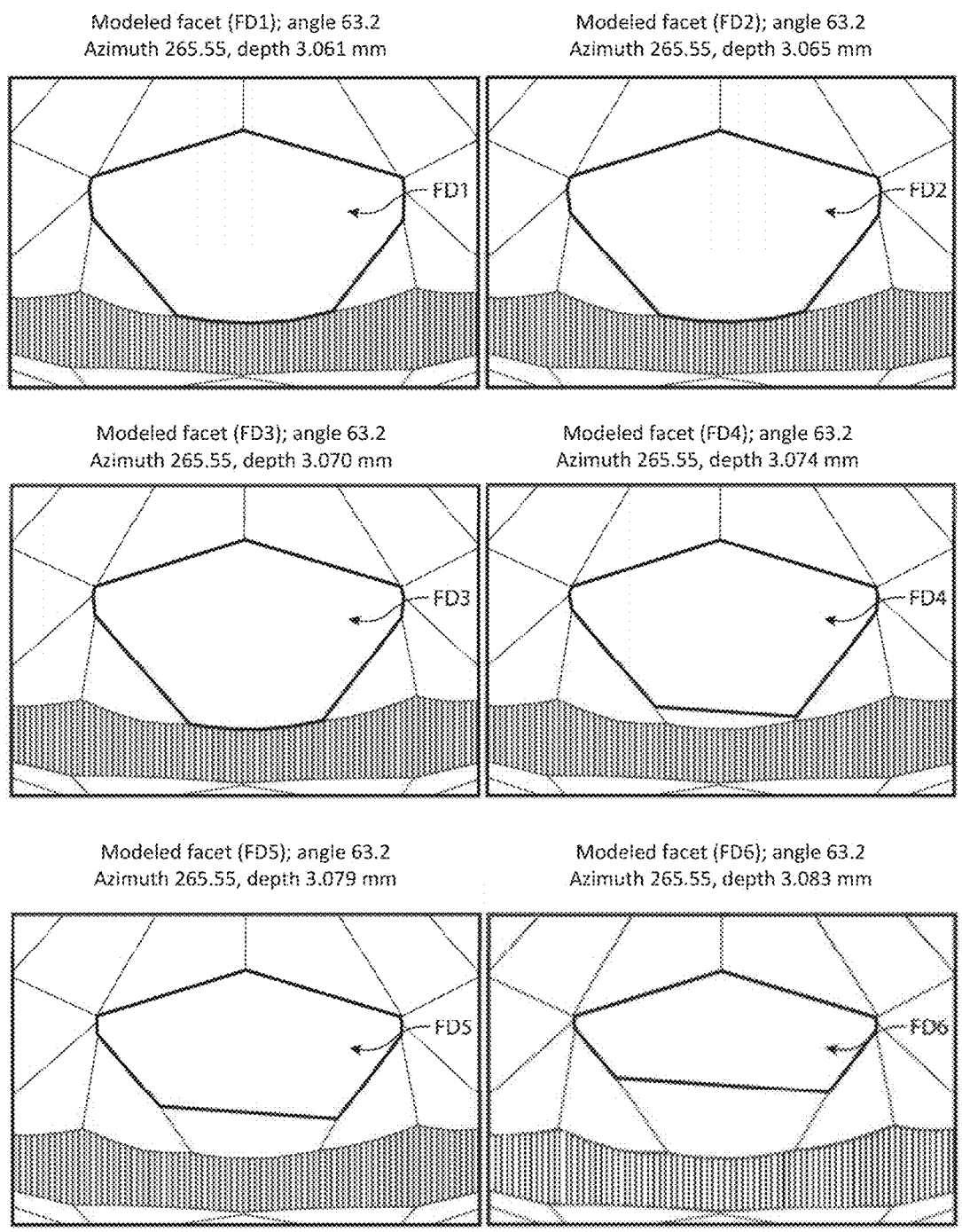

The area of symmetric difference of polygons formed by the contour of a polished facet and the contour of a planned facet may be minimized by calculating intermediate planned facets FD2, FD3, FD4, FD5, FD6 for a series of subsequent depths before reaching the final planned facet FD1 (=FD) and by calculating the area of symmetric difference for each of the planned facets FD1-FD6, see also FIG. 6E.

FIG. 6E shows a plurality of intermediate modeled facets (FD1 to FD6, wherein FD1 corresponds with the final planned facet) with a different depth modeled by software in a first stage of gradient minimization method. The plurality of modeled facets is not limited to the facets FD1 to FD6 shown in FIG. 6E, and many more facets may be used. For each of those modelled facets, the software can define the facet contour based on the facet parameters and the 3D model of the gemstone.

Instead of using the area of symmetric difference as a metric to determine the best fitting modelled facet, also other metrics may be used to determine a difference between the contour of the polished facet F2 and the contour of a modelled facet FD1-FD6, such a the mean square distance between the contour of the polished facet F2 and the contour of a modelled facet FD1-FD6, and other appropriate metrics. In other words, different objective functions can be used to estimate the match between two polygons, and using a symmetric difference value or a standard deviation value are merely examples.

Also, different methods can be used to find an extremum of those objective functions. For example it could be a gradient descent or minimization method. In other words both the objective function and method of finding its extremum can be changed, and embodiments of the invention are not limited to those methods. Other methods can be used to achieve similar results.

FIG. 6F shows the union and intersection areas calculated for all modeled facets FD1-FD6 shown on FIG. 6E. According to the calculation results the minimal area difference between union and intersection areas can be achieved for modeled facet FD4.

Figure 6G:
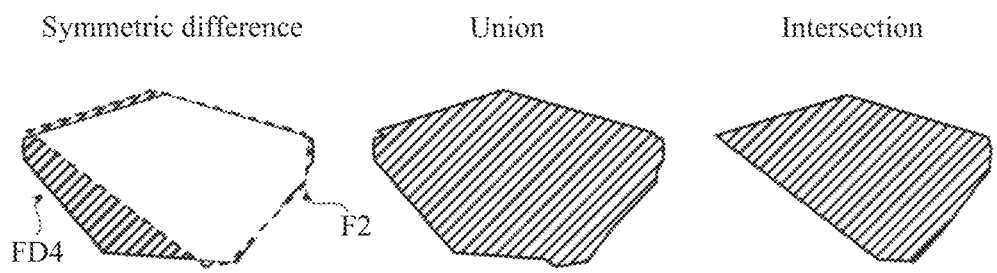

FIG. 6G shows the example comparison process based on symmetric difference between real polished facet polygon F2 and modeled facet polygon FD4. For completeness, it is repeated that the comparison process may be conducted by aligning the contours of polished facet F2 and modeled facet contour FD4; calculation of the union area between two contours; calculation of the intersection area between two contours; and calculation of the symmetric difference between the two contours F2 and FD4. This difference could be used to select the modeled facet FD4 (with known parameters) with closest contour resemblance to the real facet F2.

Figure 6H:
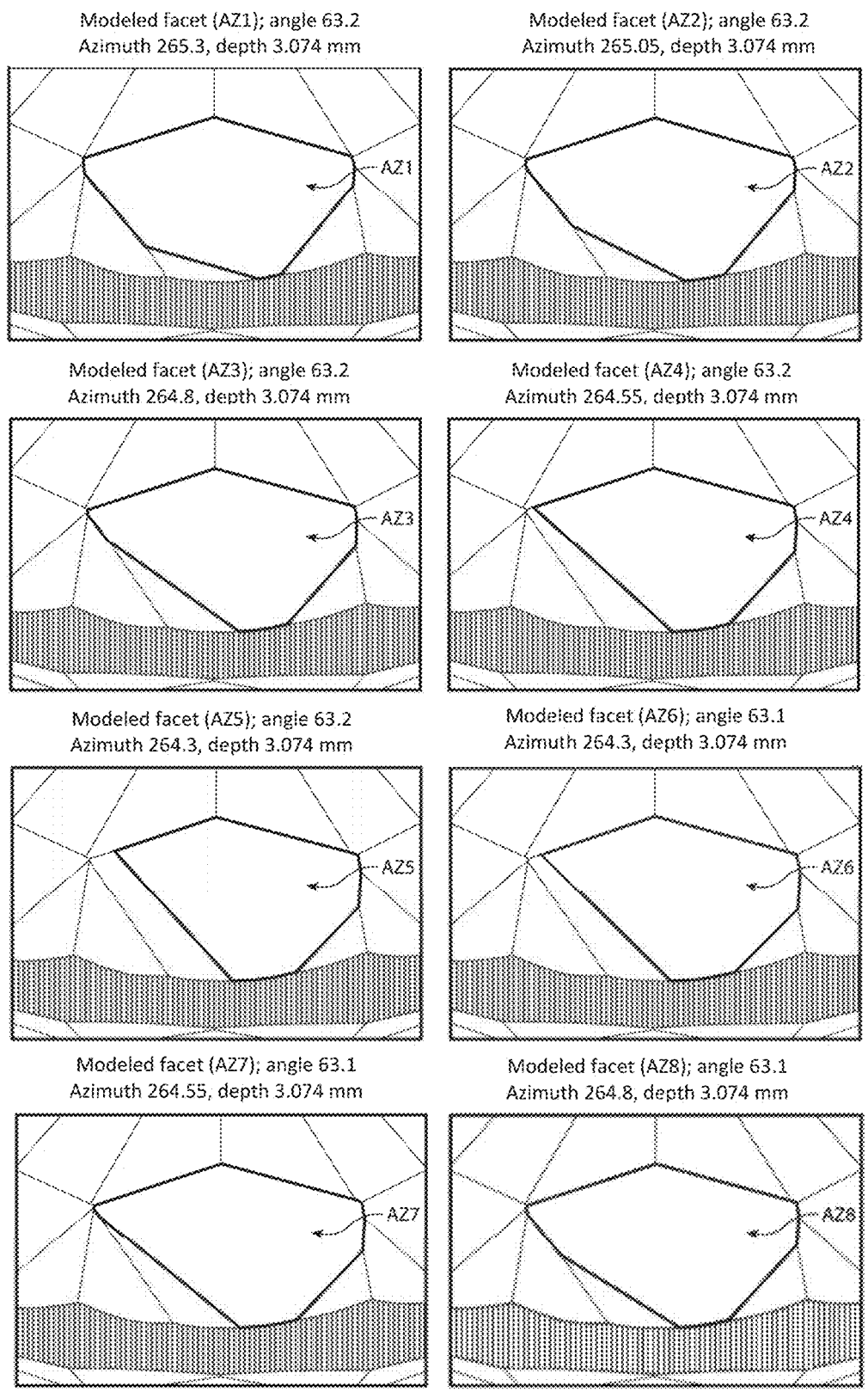

FIG. 6H shows a plurality of facets (AZ1 to AZ8) with different parameters (slope angle and azimuth angle) modeled by software in a second stage of a gradient minimization method. The plurality of modeled facets are not limited to the facets shown on FIG. 6H, and many more modelled facets may be calculated.

FIG. 6I shows the union and intersection areas calculated for the modeled facets AZ1 to AZ8 shown on FIG. 6H. According to the calculation results the minimal area difference between union and intersection areas can be achieved for modeled facet AZ4. As explained above, also other metrics may be used to calculate a difference between the polished facet F2 and the modeled facets AZ1 to AZ8.

Figure 6J:
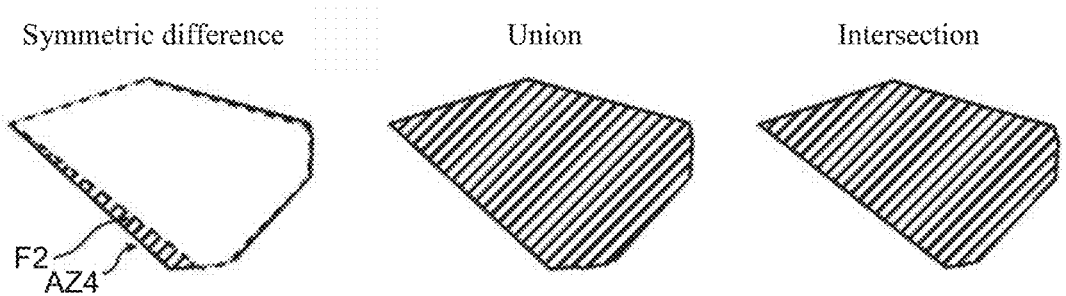

FIG. 6J shows the example comparison process based on symmetric difference between real polished facet polygon F2 and modeled facet polygon AZ4. Further optimization steps using smaller parameter steps (slope, azimuth, depth) can be used for calculating further modelled facets in order to further minimize the difference to achieve an even higher precision of F2 facet parameters estimation.

Using the knowledge of the parameters of AZ4 (or of an even further optimized modelled facet), the polishing parameters of a further polishing step may be set in order to achieve the final planned surface FD.

Figure 7:
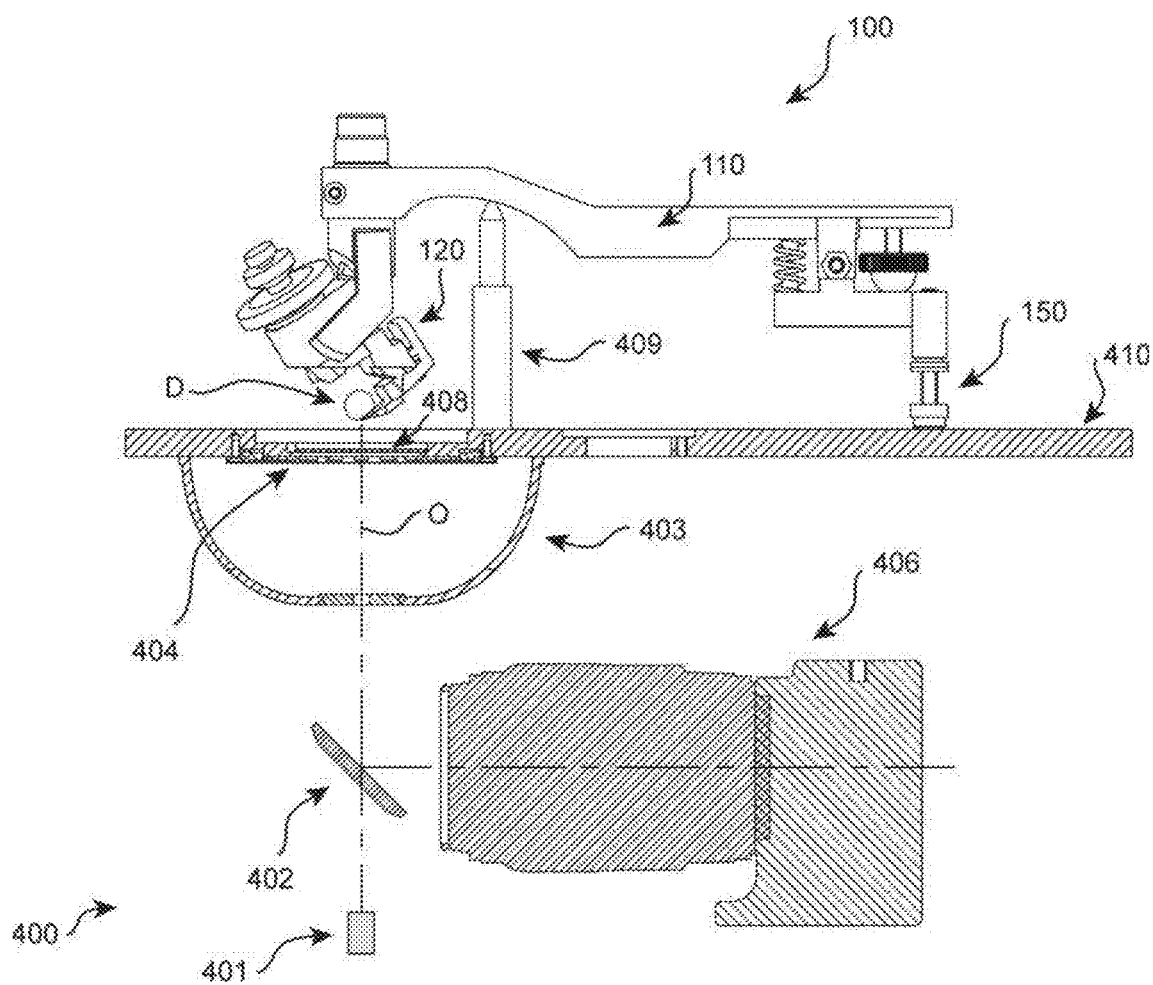
FIG. 7 illustrates schematically an exemplary embodiment of part of a system of the invention including a reflect image capturing device that allows acquiring the facet reflect image of the facet along with the ASET image of the stone while a diamond is fixed in the dop.

FIG. 7 illustrates another exemplary embodiment of parts of a system of the invention including a tang 100 arranged in a reflect image capturing device 400 that allows acquiring a facet reflect image along with a diamond ASET (Angular Spectrum Evaluation Technology) image while diamond is fixed in the dop 120 of the tang 100. The reflect image capturing device 400 comprises a light source 401, a mirror 402, an ASET lighting dome 403, a ring LED light 404, a camera and lens unit 406; a support structure for the tang 100 comprising a support surface 410 and a support element 409 in the form of an actuator for height adjustment; and a transparent plate 408. A diamond D arranged in the dop 120 is positioned above ring LED light 404 at a distance of the transparent plate 408.

In embodiments of the method of the present invention, a facet to be polished is polished in the polishing device 1000 with a tang 100 of FIG. 4, whereupon the tang 100 is transferred to the reflect image capturing device 400 of FIG. 7 in order to obtain a reflect image and an ASET image of the facet polished. These steps can be repeated a number of times as has been illustrated and explained above with reference to FIGS. 3A-3G, in order to obtain a series of reflect and ASET images of polished facets F1, F2, etc.

The reflect image data typically provides enough data for facet parameter estimation for facets with a triangular shape. But in some cases for facets with quadrilateral shape it is difficult to estimate the facet parameters based only a reflect image, because the facet incline may be compensated with shift and there could be a plurality of facet positions that could give similar reflect images. However, in this event, the combined data set comprising of reflect image data and color structural lighting image (for example ASET) data can give enough data to estimate the facet parameters, even for all polygonal facets. An example of an image capturing device 400 that allows acquiring the facet reflect image along with a diamond image in color structural light is shown on FIG. 7, see the description above. Generally, for color structural lighting the light source slope and azimuth is coded in color, such that different facets reflect light from different directions, resulting in facets with different colors. Such a color structural lighting image can be used to improve the accuracy of the facet contour obtained from the reflect image.

Figure 8A:
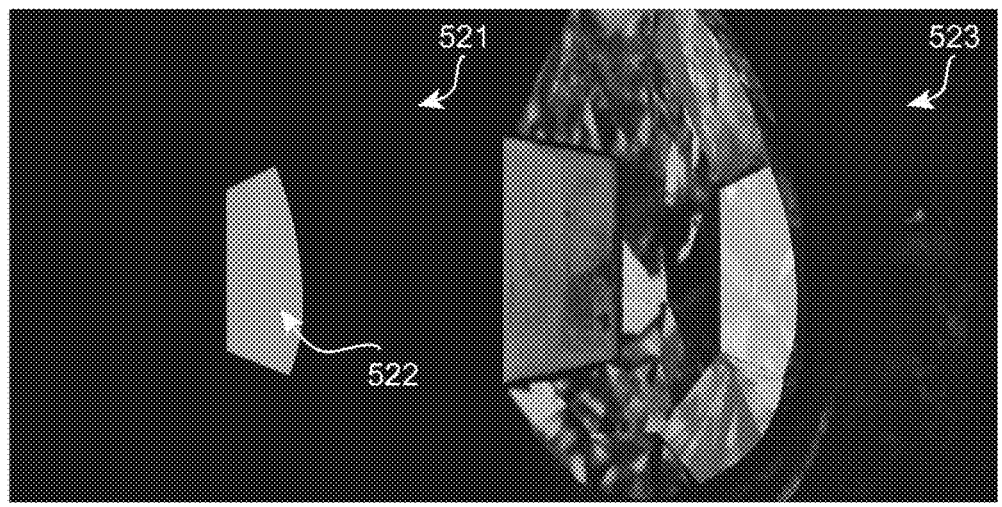
FIGS. 8A-8C show examples of diamond reflect and structural light (ASET) images acquired with the image capturing device shown on FIG. 7.

FIG. 8A shows diamond images acquired on the device of FIG. 7. Image 521 is a diamond reflect image that shows the reflection of diamond polygonal facet 522. Image 523 is a diamond image in structural light (ASET) comprising a number of facets in various colors (not visible in the black and white picture but well known to a skilled person), wherein e.g. red may indicate the brightest areas; green may indicate less bright light return from an indirect source, and blue may indicate a contrast pattern. The facet contour 522 obtained from the reflect image 521 on the left may be compared with facet data obtained from image 523 to improve the contour data derived from the reflect image 521.

Figure 8B:
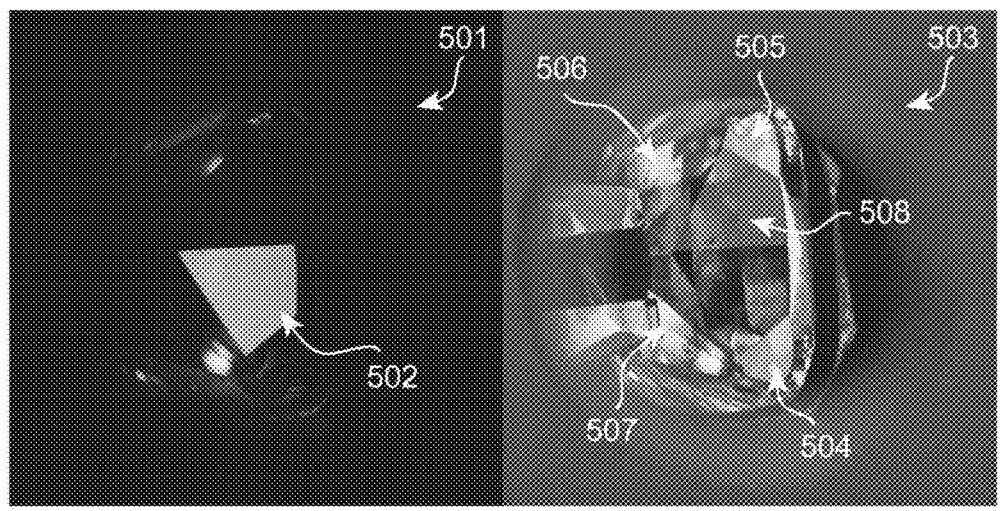

FIG. 8B shows diamond images acquired on the device of FIG. 7. Image 501 is a diamond reflect image that shows the reflection of diamond polygonal facet 502. Image 503 is a diamond image in structural light (ASET) comprising first facets 504, 505 (red, indicating the brightest areas); second facets 506, 507 (green, indicating less bright light return from an indirect source) and a third facet 508 (blue, indicating a contrast pattern). The facet contour 502 obtained from the reflect image 501 on the left may be compared with facet data obtained from image 503 to improve the accurateness.

Figure 8C:
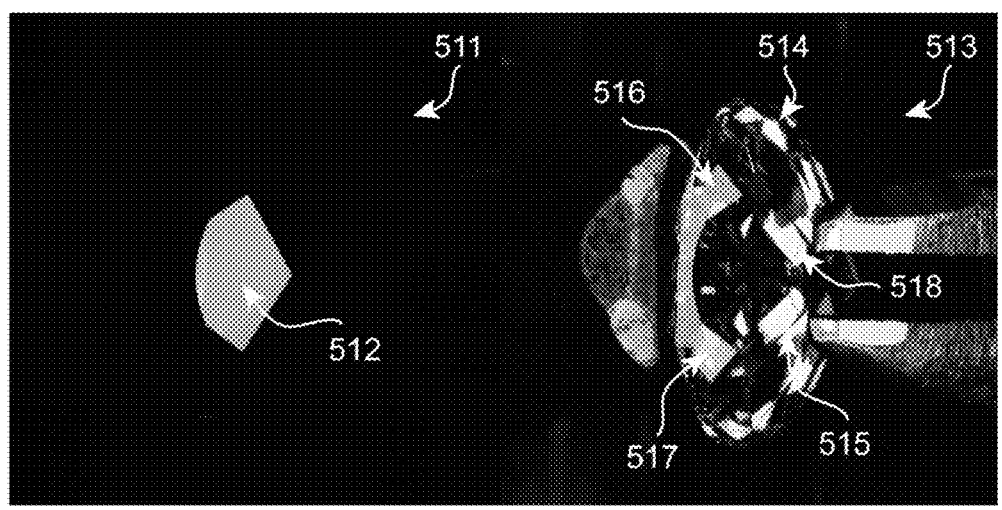

FIG. 8C shows another example of diamond images acquired on the device of FIG. 7. Image 511 is a diamond reflect image that shows the reflection of diamond polygonal facet 512. Image 513 is the diamond image in structural light (ASET) comprising a first facet 514 (red), second facets 515, 516, 517, 518 (green). The facet contour 512 obtained from the reflect image 511 on the left may be compared with facet data obtained from image 513 to improve the accurateness.

In typical situations, the reflect image gives sufficiently accurate information on the current facet contour, and the reflect image is the main source of information. However, the additional ASET image may give information on the arrangement between the polished facet and neighboring facets, and may further improve the contour data derived from the reflect image.

Figure 9A:
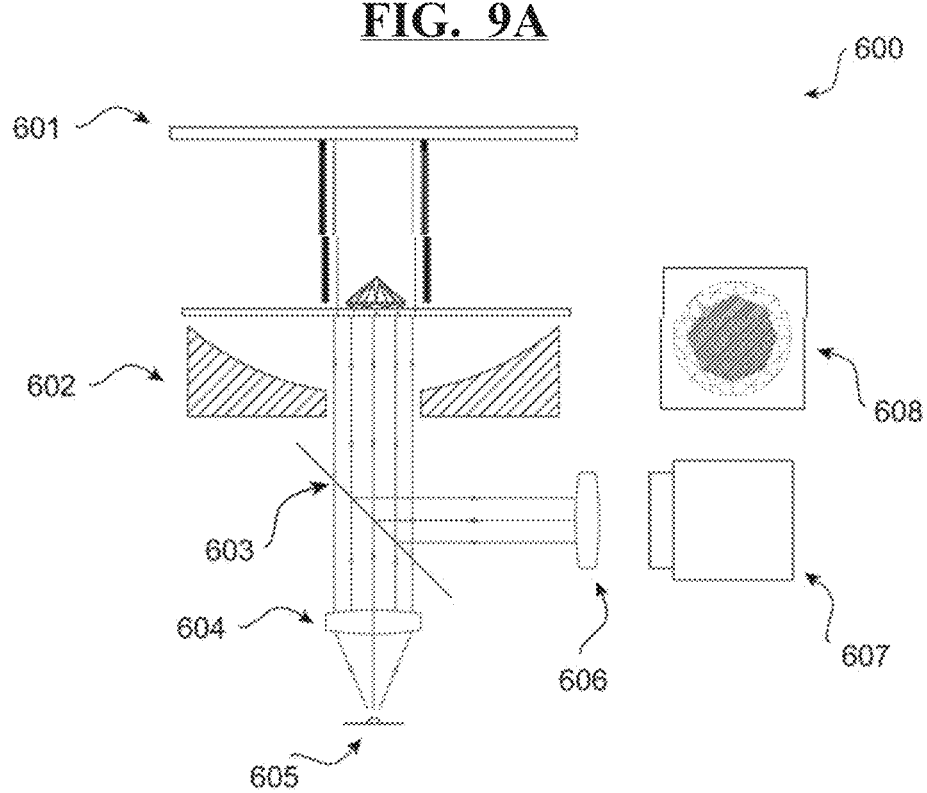
FIGS. 9A and 9B illustrate schematically two other exemplary embodiments of part of a system of the invention including a reflect image capturing device that allows acquiring a facet reflect image.
Figure 9B:
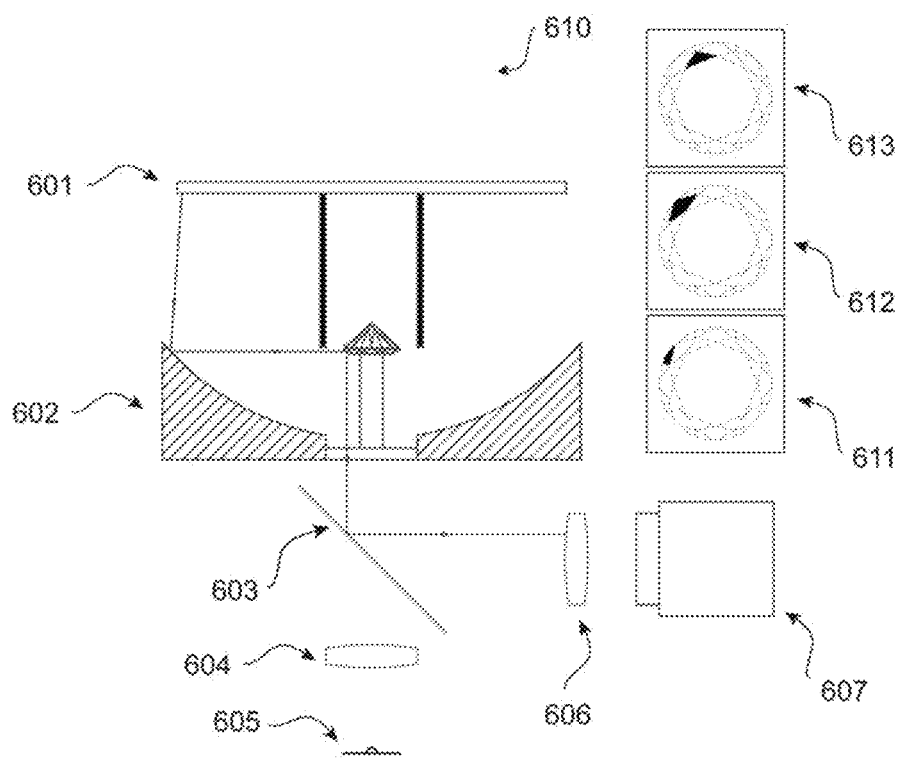

Another example of an image capturing device that allows capturing images in spatial structure lighting is shown on FIGS. 9A and 9B. FIG. 9A illustrates an exemplary embodiment of parts of a crown reflect system. A similar system has been described in U.S. Pat. No. 7,259,839 B2 in the name of the inventor, entitled "Method and Apparatus for examining a Diamond", which is included herein by reference. The method comprises illuminating the diamond to visually distinguish a facet from adjacent facets when viewed from a predetermined location, and then capturing an image of the diamond as viewed from this predetermined location. The image is then analyzed to determine the location of at least one point located on an edge of a facet by identifying a discontinuity in the properties of light transmitted from the diamond to the viewing location. U.S. Pat. No. 7,259,839 B2 mainly describes the analyzing of a pavilion, but for the present application it may also be used for obtaining image data of the crown of a diamond. The image capturing device of FIG. 9A comprises a table reflect device 600 comprising an illumination display 601, a spherical mirror 602, a 50-50 mirror 603, lenses 604 and 606, a LED light source 605, a registration optical system/camera 607. FIG. 9A further shows an example of a reflect image 608 of the table. Although not illustrated, the skilled person understands that the system of FIG. 9A can be provided with a support structure for a tang, wherein the support structure is configured for placing the tang including the dop with the gemstone in the correct position for obtaining the reflect image of a polished facet of the gemstone in the dop.

FIG. 9B illustrates another exemplary embodiment of parts of an image capturing system including a crown reflect device 610 comprising an illumination display 601, a spherical mirror 602, a 50-50 mirror 603, lenses 604 and 606, a LED light source 605, a registration optical system/camera 607. FIG. 9B further shows an example of an upper halve reflect image 611, a crown main facet reflect image 612 and a star facet reflect image 613.

A person of skill in the art would readily recognize that certain steps of the various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Whilst the principles of the invention have been set out above in connection with specific embodiments, it is to be understood that this description is merely made by way of example and not as a limitation of the scope of protection which is determined by the appended claims.

The invention claimed is:

1. A method for controlling the polishing of a gemstone, said method comprising:
   a. obtaining a three-dimensional model of the gemstone;
   b. fixing the gemstone in a dop of a tang of a polishing device, wherein an initial facet to be polished is aligned in the dop;
   c. obtaining of at least one image of the initial facet to be polished while the gemstone is in the tang, such that a contour of the initial facet can be determined from the at least one image;
   d. based on the obtained at least one image and the obtained three-dimensional model, determining at least first dop setting parameters for a first planned facet positioned between the initial facet to be polished and a desired final polished facet;
   e. based on the first dop setting parameters for the first planned facet, setting the dop for obtaining a polished gemstone having a polished facet approaching the first planned facet; and polishing the gemstone accordingly;
   f. obtaining of at least one image of the polished facet while the gemstone is in the tang, such that a contour of the polished facet can be determined from said at least one image;
   g. based on the obtained at least one image of the polished facet and the three-dimensional model, determining at least further dop setting parameters for a further planned facet;
   h. based on the further dop setting parameters for the further planned facet, setting the dop for obtaining a polished gemstone having a polished facet approaching the further planned facet; and polishing the gemstone accordingly;
   i. if necessary, repeating the steps f-h until the desired final polished facet of the gemstone is obtained;
   wherein the gemstone remains fixed in the dop during steps (c)-(i).

2. The method of claim 1, wherein step (g) comprises: based on the obtained at least one image of the polished facet and the three-dimensional model, updating the three-dimensional model; and using the updated three-dimensional model to obtain the further dop setting parameters.

3. The method of claim 1, wherein the obtaining at least one image of the initial facet in step (c) and/or the obtaining at least one image of the polished facet in step (f) comprises obtaining a reflect image by illuminating the initial/polished facet with co-axial light with an optical axis directed perpendicular on said facet and by sensing light reflected in the direction of the optical axis.

4. The method of claim 1, wherein the setting of the dop setting parameters in step e and/or f comprises at least one of: adjusting a slope angle of the dop with respect to a lap of the polishing device, adjusting an azimuth angle of the dop and setting a polishing depth.

5. The method of claim 1, wherein the dop setting parameters for the first planned facet are representative for a difference in slope angle of the dop between the first planned facet and the initial facet (F0), a difference in azimuth angle of the dop between the first planned facet and the initial facet (F0), and the polishing depth of the first planned facet.

6. The method of claim 1, wherein the settings for the further planned facet are representative for a difference in slope angle of the dop between the first polished facet (F1) and the further planned facet, a difference in azimuth angle of the dop between the first polished facet (F1) and the further planned facet, and the polishing depth of the further planned facet.

7. The method of claim 1, wherein during step (d) the first dop setting parameters for the first planned facet as well as further dop setting parameters for one or more further planned facets between the initial facet to be polished and a desired polished facet (FD), are determined; and wherein during step (g) determining at least further dop setting parameters for a further planned facet comprises verifying, based on the obtained at least one image in step (f), whether the previously determined further dop setting parameters for the further planned facet are correct and, if necessary, adjusting the further dop setting parameters for the further planned facet.

8. The method of claim 1, wherein in step (g) the determining of at least further dop setting parameters for a further planned facet is done by:
   calculating a plurality of different possible facets between the initial facet and the desired final polished facet based on the three-dimensional model of the gemstone;
   comparing contours of said plurality of different possible facets with a contour of the polished facet derived from the obtained at least one image;
   determining the further dop setting parameters based on a result of the comparing.

9. The method of claim 1, wherein after step (i) the three-dimensional model of the gemstone is changed based on the obtained final polished facet, and the method is repeated for a following facet to be polished.

10. A non-transitory computer readable storage medium comprising computer-executable instructions to perform the following steps when run on a computer:
    based on an obtained at least one image of a gemstone and an obtained three-dimensional model of a gemstone, determining at least first dop setting parameters for a dop of a tang of a polishing device, for a first planned facet positioned between an initial facet to be polished and a desired final polished facet;
    based on the obtained at least one image of a polished facet of the gemstone and the three-dimensional model of the gemstone, determining at least further dop setting parameters for the dop of the tang of the polishing device, for a further planned facet.

11. A system for controlling the polishing of a gemstone, said system comprising:
    a 3D scanner configured for obtaining a three-dimensional model of the gemstone;
    a polishing device comprising a tang with a dop, and a polishing wheel;
    an image capturing device configured for obtaining of at least one image of a polished facet of the gemstone whilst the gemstone is in the tang, such that a contour of the polished facet can be determined from said at least one image;
    a control unit configured to determine, based on the obtained at least one image and the obtained three-dimensional model, dop setting parameters for a planned facet positioned between an initial facet to be polished and a desired final polished facet.

12. The system of claim 11, wherein the control unit is configured to update, based on the obtained at least one image of the polished facet and the three-dimensional model, the three-dimensional model; and to use the updated three-dimensional model to obtain the dop setting parameters.

13. The system of claim 11, wherein the image capturing device is configured for obtaining at least one image of the polished facet by illuminating the initial/polished facet with co-axial light with an optical axis directed perpendicular on said polished facet and by sensing light reflected in the direction of the optical axis.

14. The system of claim 11, wherein the image capturing device has a support structure for the tang, and wherein the image capturing device is arranged such that an optical axis thereof is substantially perpendicular on a polished facet of a gemstone arranged in the tang when the tang is positioned on the support structure.

15. The system of claim 14, wherein the image capturing device (300, 400) comprises a transparent plate arranged to be located at a distance below a gemstone placed in a tang on the support structure, and wherein the optical axis of the image capturing device is oriented vertically on the transparent plate.

16. The system of claim 14, wherein the tang comprises a frame supported on a support foot; wherein the support structure comprises a support surface for the support foot of the tang and a support element for the frame of the tang, wherein at least one of the support foot and the support element are configured to allow an adjustment of the position of the frame of the tang, such that the orientation of a polished facet of the gemstone in the tang can be adjusted.

17. The system of claim 11, wherein the dop setting parameters for the planned facet are representative for a difference in slope angle of the dop between the planned facet and a polished facet, a difference in azimuth angle of the dop between the planned facet and the polished facet, and a polishing depth of the planned facet.

18. The system of claim 11, wherein the control unit comprises a computer program comprising computer-executable instructions to perform the following steps:
based on an obtained at least one image of a gemstone and an obtained three-dimensional model of a gemstone, determining at least first dop setting parameters for a dop of a tang of a polishing device, for a first planned facet positioned between an initial facet to be polished and a desired final polished facet;
based on the obtained at least on image of a polished facet of the gemstone and the three-dimensional model of the gemstone, determining at least further dop setting parameters for the dop of the tang of the polishing device, for a further planned facet.

19. The system of claim 11, wherein the control unit is configured to determine dop setting parameters for a planned facet by:
calculating a plurality of possible facets between the initial facet and the desired final polished facet based on the three-dimensional model of the gemstone;
comparing contours of said plurality of different possible facets with a contour of the polished facet derived from the obtained at least one image;
determining the dop setting parameters based on a result of the comparing.

* * * * *